United States Patent
Lee et al.

(10) Patent No.: US 11,846,814 B2
(45) Date of Patent: Dec. 19, 2023

(54) HOLOGRAM DISPLAY DEVICE

(71) Applicant: Samsung Display Co., Ltd., Yongin-si (KR)

(72) Inventors: Jiwon Lee, Suwon-si (KR); Youngchan Kim, Incheon (KR); Byungchoon Yang, Seoul (KR); Sang-Ho Kim, Gwangmyeong-si (KR); Cheonmyeong Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/829,523

(22) Filed: Jun. 1, 2022

(65) Prior Publication Data

US 2022/0291460 A1   Sep. 15, 2022

Related U.S. Application Data

(62) Division of application No. 16/987,630, filed on Aug. 7, 2020, now Pat. No. 11,372,174.

(30) Foreign Application Priority Data

Nov. 25, 2019  (KR) .................. 10-2019-0152485

(51) Int. Cl.
  *G02B 6/42*   (2006.01)
  *G02F 1/1334*   (2006.01)
  *F21V 8/00*   (2006.01)

(52) U.S. Cl.
  CPC ......... *G02B 6/4204* (2013.01); *G02B 6/0023* (2013.01); *G02F 1/13342* (2013.01)

(58) Field of Classification Search
  CPC .. G02B 6/4204; G02B 6/0023; G02F 1/13342
  See application file for complete search history.

(56) References Cited

U.S. PATENT DOCUMENTS

| | | | |
|---|---|---|---|
| 7,450,188 B2 | 11/2008 | Schwerdtner | |
| 8,995,037 B2 | 3/2015 | Chae et al. | |
| 9,291,828 B2* | 3/2016 | Kroll | H04N 13/366 |
| 2013/0077154 A1 | 3/2013 | Popovich et al. | |
| 2013/0300997 A1 | 11/2013 | Popovich et al. | |
| 2020/0413032 A1* | 12/2020 | Lyubarsky | H04N 13/32 |

FOREIGN PATENT DOCUMENTS

| KR | 1020180081631 A | 7/2018 |
|---|---|---|
| KR | 101946031 B1 | 2/2019 |

\* cited by examiner

*Primary Examiner* — Sung H Pak
(74) *Attorney, Agent, or Firm* — CANTOR COLBURN LLP

(57) ABSTRACT

A hologram display device includes a light source unit, a light guide plate, a spatial light modulator, a sensing unit, and a light source driving unit. The light source unit includes a plurality of light sources and emits light when at least one of the plurality of light sources is turned on. The light guide plate converts the light emitted thereto from the light source unit to a planar light beam. The spatial light modulator spatially modulates the planar light beam to produce a hologram image. The sensing unit senses a position of a user watching the hologram image, and the light source driving unit turns on the at least one of the plurality of light sources, based on information on the position of the user obtained by the sensing unit.

4 Claims, 18 Drawing Sheets

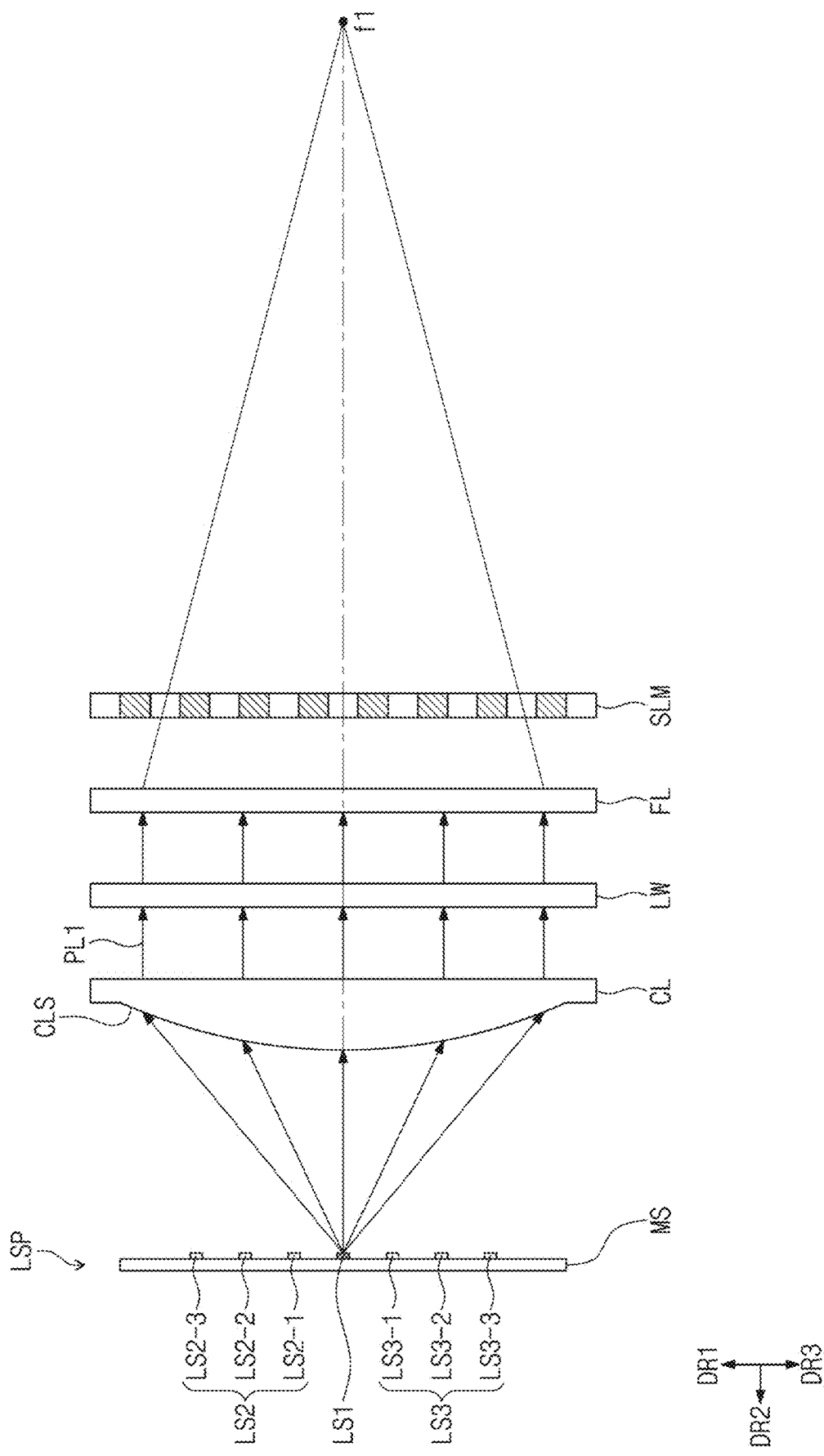

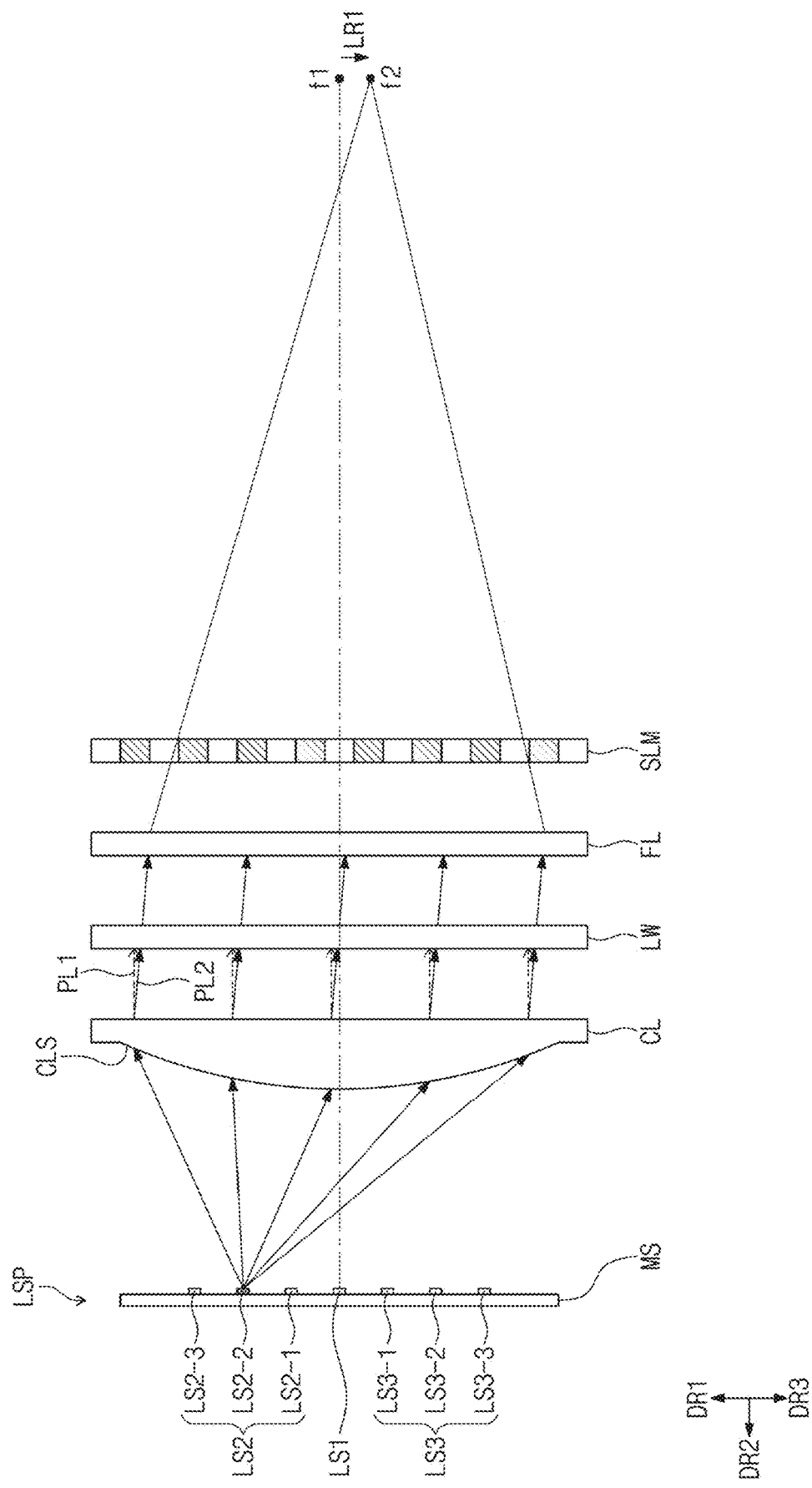

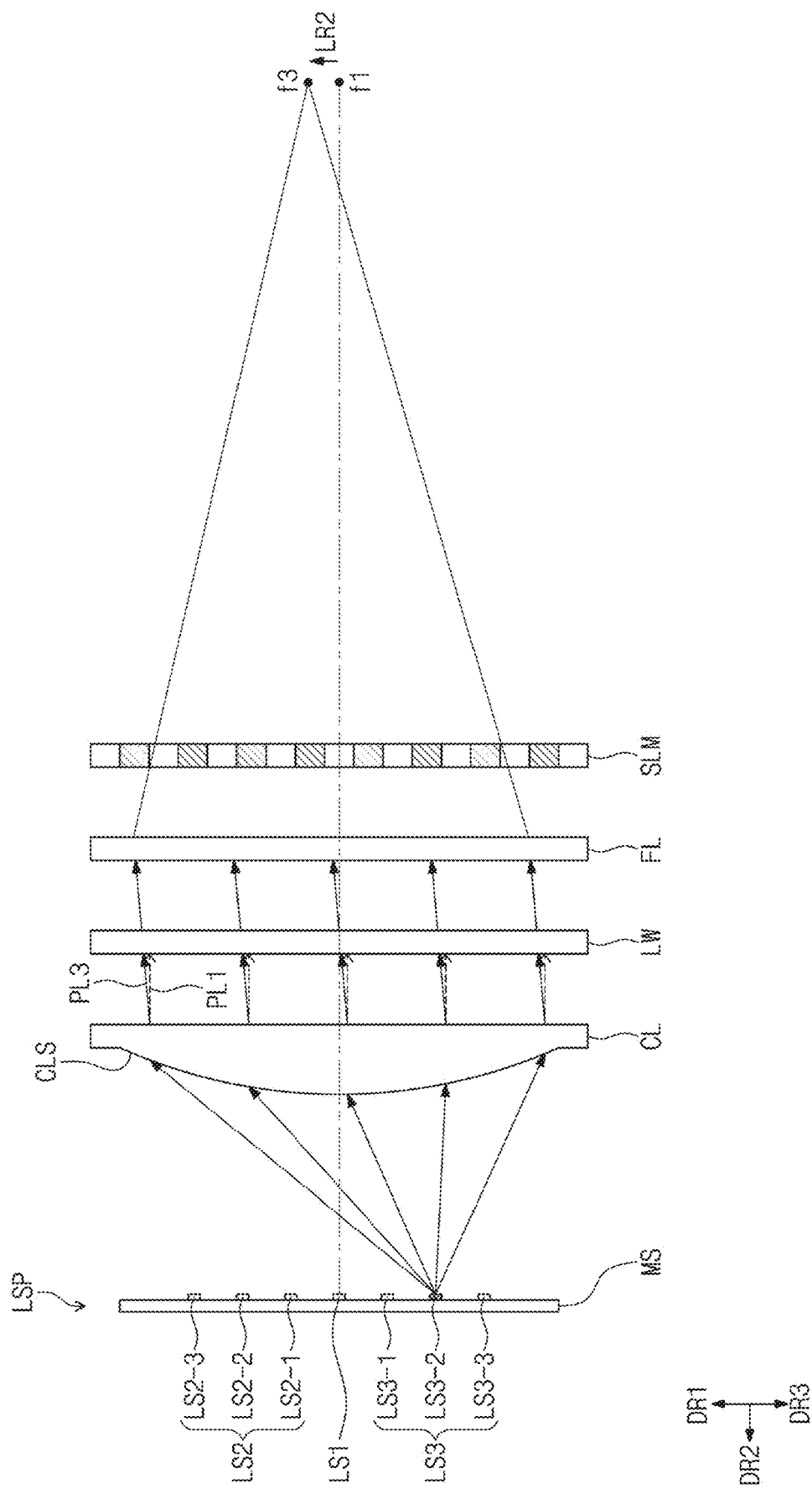

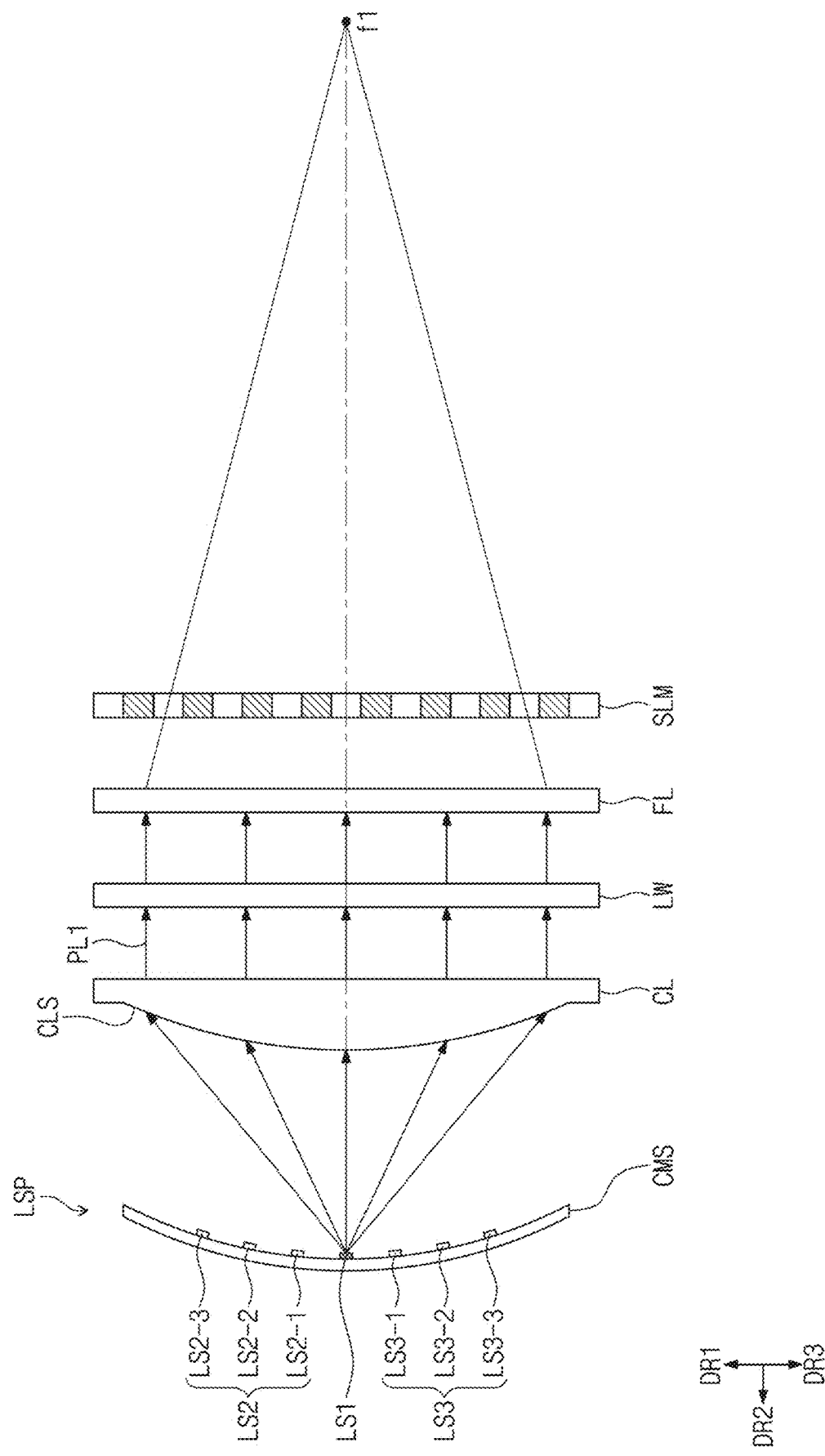

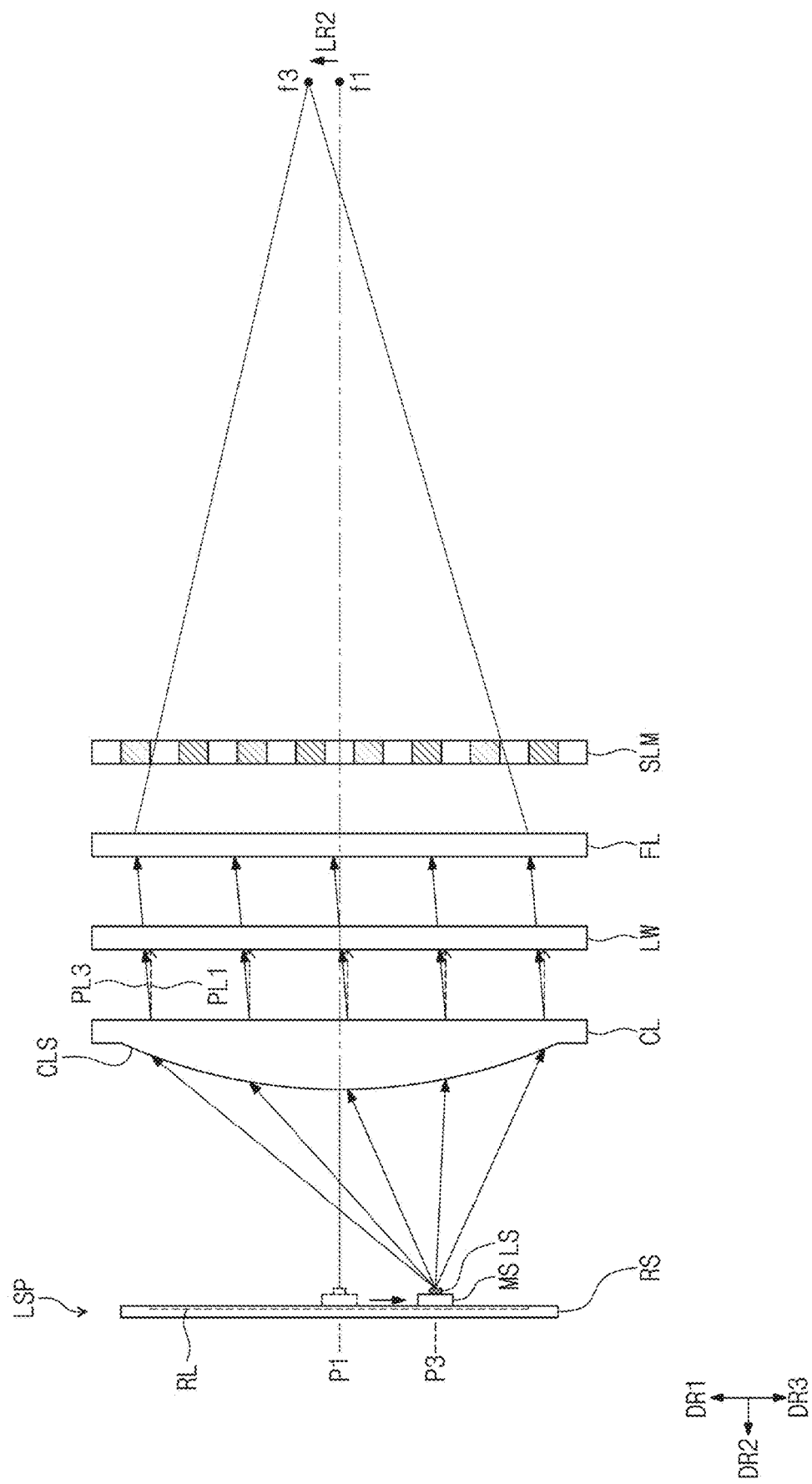

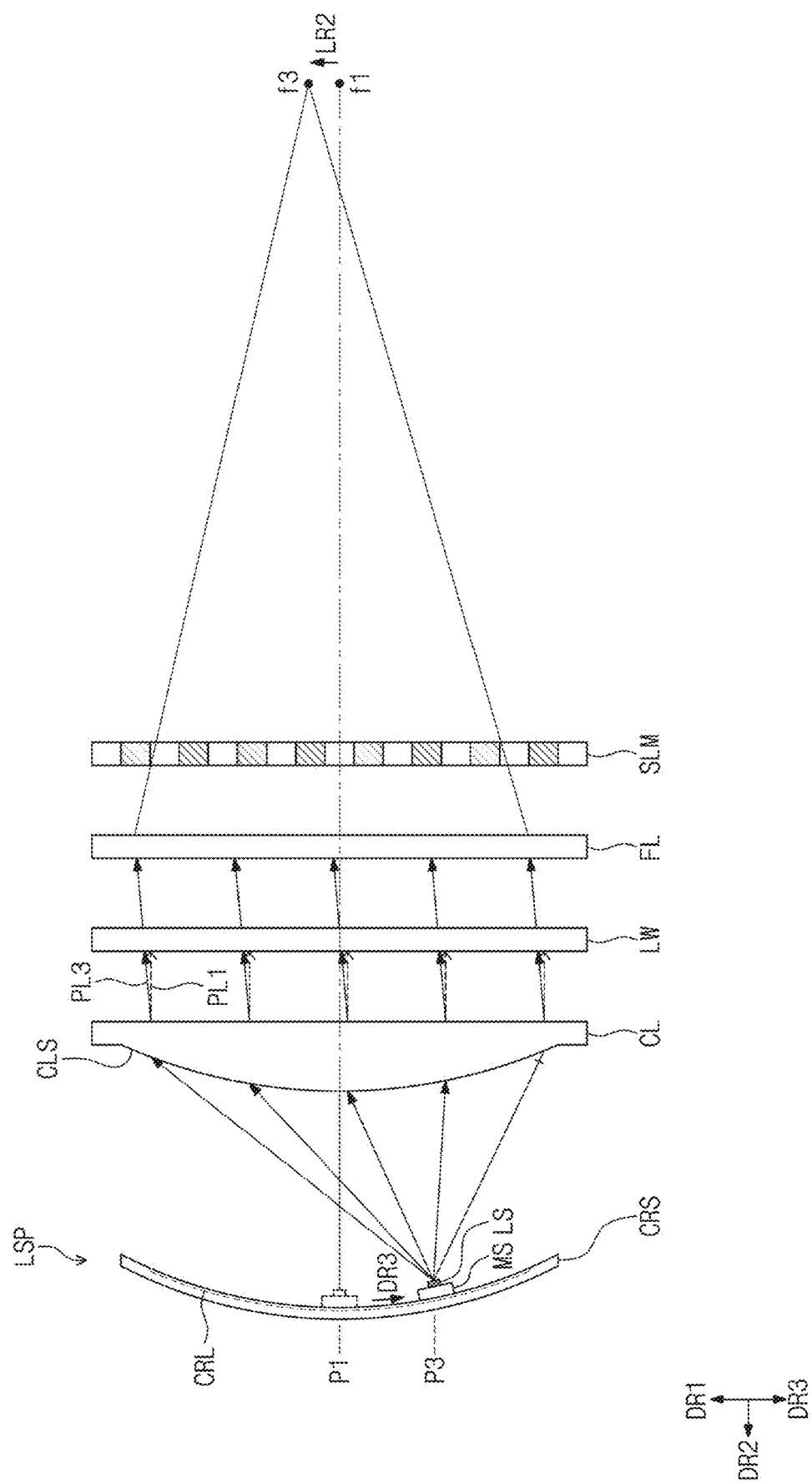

HOLOGRAM DISPLAY DEVICE

This application is a divisional of U.S. patent application Ser. No. 16/987,630, filed on Aug. 7, 2020, which claims priority to Korean Patent Application No. 10-2019-0152485, filed on Nov. 25, 2019, and all the benefits accruing therefrom under 35 U.S.C. § 119, the content of which in its entirety is herein incorporated by reference.

BACKGROUND

1. Field

The disclosure relates to a hologram display device, and in particular, to a hologram display device with extended viewing angle.

2. Description of the Related Art

In the case where a hologram-based stereoscopic imaging technology is used, it is possible to radically overcome an eye fatigue issue, which occurs in the current binocular-disparity-based stereoscopic imaging technology, and thus, the hologram-based stereoscopic imaging technology is emerging as a next-generation stereoscopic imaging technology. Unlike a conventional illusion-based stereoscopic imaging technology, the hologram-based stereoscopic imaging technology allows a user to directly see the actual stereoscopic image, so that the user can feel the same stereoscopic effect as in a real object. Therefore, even after watching the hologram image for a long time, the eye fatigue issue may not occur in the hologram-based stereoscopic imaging technology.

Recently, there is an increasing interest in a hologram technology using a digital hologram method using a spatial light modulator

SUMMARY

A hologram-based stereoscopic imaging technology is greatly affected by the performance or quality of a spatial light modulator. A liquid crystal display panel may be used as the spatial light modulator, and in this case, image characteristics (e.g., size and viewing angle) of a hologram image displayed by a hologram imaging device may be determined by geometrical features (e.g., size and distance) of pixels in the liquid crystal display panel.

An embodiment of the invention provides a hologram display device with wide viewing angle.

According to an embodiment of the invention, a hologram display device includes a light source unit, a light guide plate, a spatial light modulator, a sensing unit, and a light source driving unit. In such an embodiment, the light source unit includes a plurality of light sources and emits light when at least one of the plurality of light sources is turned on, and the light guide plate converts the light emitted thereto from the light source unit to a planar light beam. In such an embodiment, the spatial light modulator spatially modulates the planar light beam to produce a hologram image, the sensing unit senses a position of a user, and the light source driving unit turns on the at least one of the plurality of light sources, based on information on the position of the user obtained by the sensing unit.

In an embodiment, the hologram display device may further include a first optical system and a second optical system. In such an embodiment, the first optical system may be disposed between the light guide plate and the light source unit, may convert the light emitted thereto from the light source unit to a collimated beam, and may provide the collimated beam to the light guide plate. In such an embodiment, the second optical system may focus the planar light beam output from the light guide plate.

In an embodiment, the plurality of light sources may include a first light source located at a position corresponding to a center of the first optical system, a second light sources located at a first side of the first light source, and a third light sources located at a second side of the first light source.

In an embodiment, the light source driving unit may turn on the first light source when the user is located at a predetermined reference position, turn on the second light source when the user moves from the reference position to a first position, and turn on the third light source when the user moves from the reference position to a second position.

In an embodiment, the reference position may coincide with a focal position focused by the second optical system.

In an embodiment, the second light source may include a plurality of second light sources and the third light source may include a plurality of third light sources. In such an embodiment, the light source driving unit may selectively turn on one of the plurality of second light sources, based on a distance between the first position and the reference position, and the light source driving unit may selectively turn on one of the plurality of third light sources, based on a distance between the second position and the reference position.

In an embodiment, the light source unit may further include a mounting substrate, on which the first to third light sources are mounted.

In an embodiment, the mounting substrate may have a flat plate structure.

In an embodiment, the first optical system may include a convex lens surface, and the mounting substrate may have a curved structure corresponding to the convex lens surface.

In an embodiment, the plurality of light sources may be arranged to form a plurality of columns. In such an embodiment, the plurality of light sources may include a plurality of first light sources constituting a first column of the a plurality of columns and a plurality of second light sources constituting a second column of the a plurality of columns.

In an embodiment, each of the plurality of second light sources may be disposed in a region corresponding to a region between a corresponding pair of the plurality of first light sources.

In an embodiment, the light source unit may further include a plurality of mounting substrates, and some of the plurality of light sources may be mounted on each of the plurality of mounting substrates.

According to an embodiment of the invention, a hologram display device includes a light source unit, a light guide plate, a spatial light modulator, a sensing unit, and a position adjusting unit. In such an embodiment, the light source unit includes a rail substrate, a mounting substrate equipped on the rail substrate to be movable, and a light source mounted on the mounting substrate to generate light. In such an embodiment, the light guide plate converts the light emitted thereto from the light source unit to a planar light beam, and the spatial light modulator spatially modulates the planar light beam to produce a hologram image. In such an embodiment, the sensing unit senses a position of a user, and the position adjusting unit adjusts a position of the light source, based on information on the position of the user obtained by the sensing unit.

In an embodiment, the hologram display device may further include a first optical system and a second optical system. In such an embodiment, the first optical system may be disposed between the light guide plate and the light source unit, may convert the light emitted thereto from the light source to a collimated beam, and may provide the collimated beam to the light guide plate. In such an embodiment, the second optical system may focus the planar light beam output from the light guide plate.

In an embodiment, the position adjusting unit may turn on the light source at a first light-emitting position when the user is located at a predetermined reference position, move the light source from the first light-emitting position to a second light-emitting position when the user moves from the reference position to a first position, and move the light source from the first light-emitting position to a third light-emitting position when the user moves from the reference position to the second position.

In an embodiment, the reference position may coincide with a focal position focused by the second optical system.

In an embodiment, the first optical system may include a convex lens surface, and the rail substrate may have a curved structure corresponding to the convex lens surface.

BRIEF DESCRIPTION OF THE DRAWINGS

Embodiments of the invention will be more clearly understood from the following description taken in conjunction with the accompanying drawings. The accompanying drawings show non-limiting, exemplary embodiments as described herein.

FIGS. 3A to 3C are sectional views of the hologram display device, taken along line II-II' of FIG. 1.

FIGS. 4A to 4C are sectional views illustrating a hologram display device according to an alternative embodiment of the invention.

FIGS. 10A to 10C are sectional views of the hologram display device, taken along line of FIG. 9.

FIGS. 11A to 11C are sectional views illustrating a hologram display device according to another alternative embodiment of the invention.

DETAILED DESCRIPTION

Figure 1:
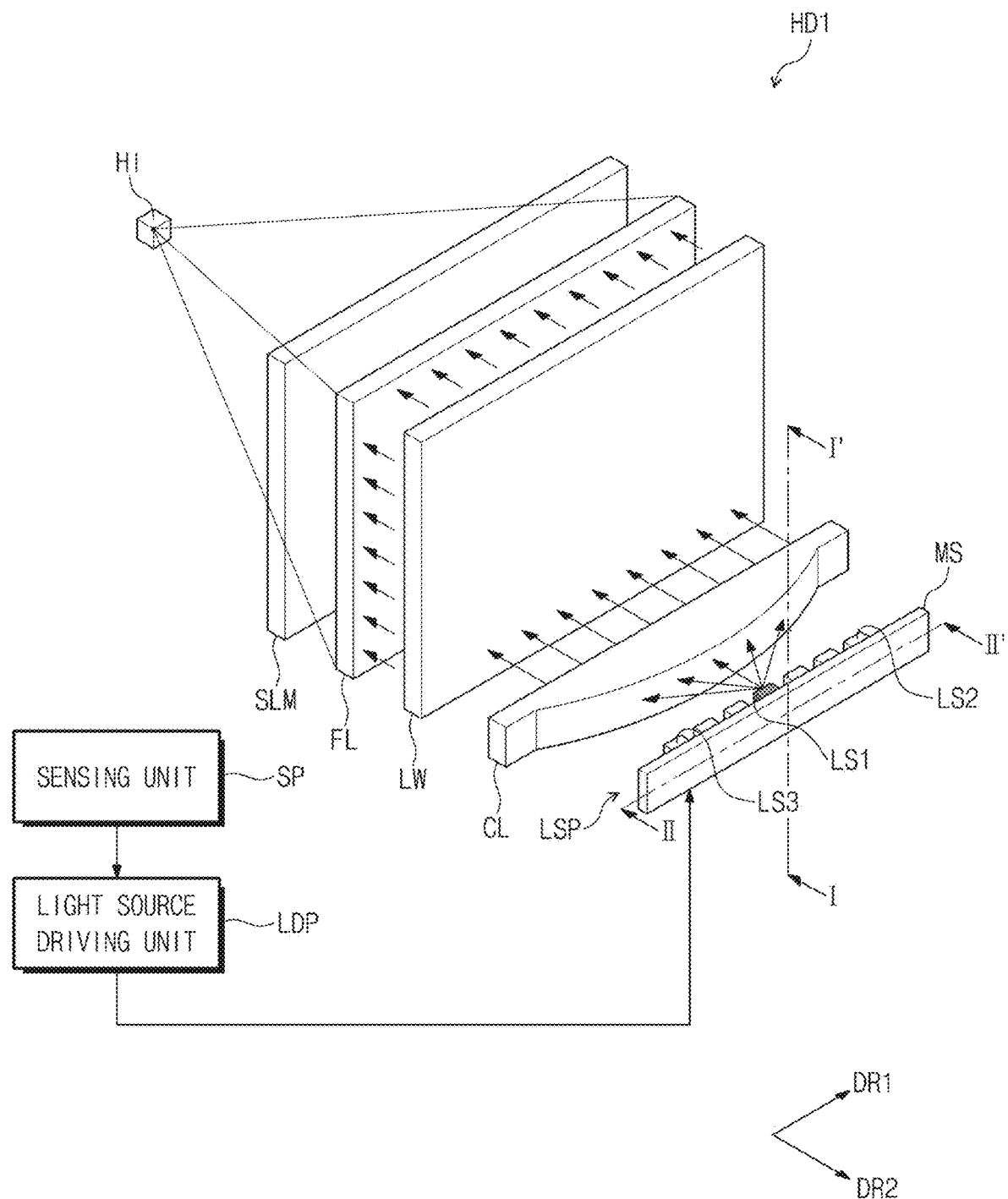
FIG. 1 is a conceptual diagram illustrating a hologram display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on", "connected" or "coupled" to another element, it can be directly connected or coupled to the other element or intervening elements may be present. In contrast, when an element is referred to as being "directly on", "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms, including "at least one," unless the context clearly indicates otherwise. "Or" means "and/or." As used herein, the term "and/or" includes any and all combinations of one or more of the associated listed items. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments of the invention are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which example embodiments of the inventions belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the invention will be described in detail with reference to the accompanying drawings.

Figure 2:
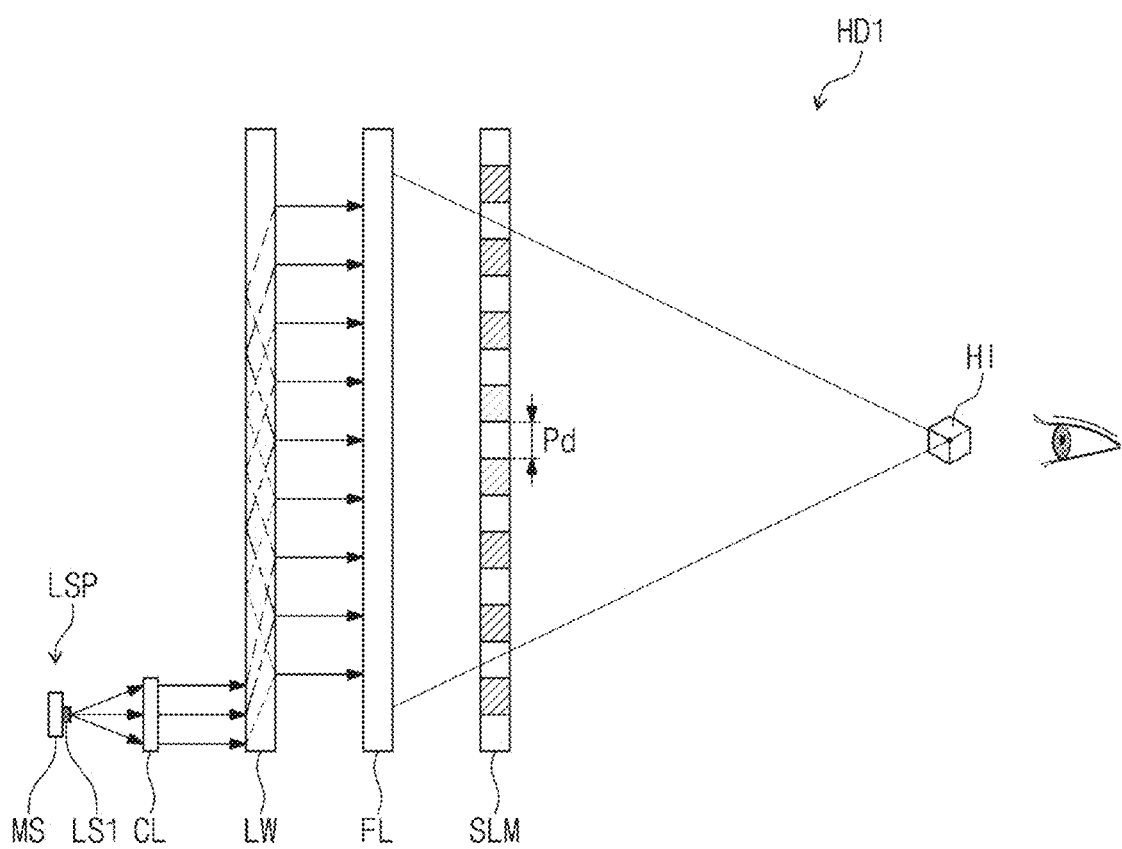
FIG. 2 is a sectional view of the hologram display device, taken along line I-I' of FIG. 1.

FIG. 1 is a conceptual diagram illustrating a hologram display device according to an embodiment of the invention, and FIG. 2 is a sectional view of the hologram display device, taken along line I-I' of FIG. 1.

Referring to FIGS. 1 and 2, an embodiment of a hologram display device HD1 may include a light source unit LSP, a first optical system CL, a light guide plate LW, a second optical system FL, and a spatial light modulator SLM.

The light source unit LSP may include a plurality of light sources LS1, LS2, and LS3. At least one of light sources LS1, LS2, and LS3 is turned on to generate light. The light source unit LSP may further include a mounting substrate MS, on which the light sources LS1, LS2, and LS3 are mounted.

The mounting substrate MS may extend in a first direction DR1, and the light sources LS1, LS2, and LS3 on the mounting substrate MS may be arranged in the first direction DR1. Each of the light sources LS1, LS2, and LS3 may be a light-emitting diode. The light-emitting diode may emit a white light. However, the invention is not limited thereof. In one alternative embodiment, for example, the light-emitting diode may emit at least one of red, green, and blue lights.

The first optical system CL may convert the light, which is provided from the light source unit LSP, to a collimated beam. In an embodiment, the light source unit LSP may output the light radially. The light, which is radially emitted from the light source unit LSP, may be incident into the first optical system CL, and the first optical system CL may convert the light, which is radially emitted from the light source unit LSP, to a collimated or parallel beam. In such an embodiment, the first optical system CL may be disposed between the light guide plate LW and the light source unit LSP to convert the light from the light source unit LSP to the collimated beam, and the collimated beam may be incident into the light guide plate LW.

In an embodiment, the first optical system CL may include an optical lens. At least a portion of the optical lens may be in a shape of a convex lens protruding in a second direction DR2, which is perpendicular to the first direction DR1. In one embodiment, for example, when viewed from a cross-sectional view of the optical lens cut parallel to the first and second directions DR1 and DR2, the optical lens may have a concave shape or a shape protruding in the second direction DR2. The optical lens may be a collimation lens.

The light guide plate LW may have a rectangular plate shape. In an embodiment, the light guide plate LW may have a rear surface, a front surface, and side surfaces connecting the rear surface to the front surface. In an embodiment, the light guide plate LW may be disposed in a way such that the rear surface faces the first optical system CL. In such an embodiment, the collimated beam provided from the first optical system CL to the rear surface of the light guide plate LW may be converted to the planar light beam by the light guide plate LW. The planar light beam may be output through the front surface of the light guide plate LW.

The second optical system FL may include a lens, to produce a hologram image HI at a desired distance. In an embodiment, the second optical system FL may include a field lens that has a size corresponding to the front surface of the light guide plate LW. FIGS. 1 and 2 illustrate an embodiment, in which the second optical system FL includes a single field lens, but the invention is not limited to this example. In one alternative embodiment, for example, the second optical system FL may include a plurality of lenses.

In an embodiment, the second optical system FL may be configured to allow the planar light beam to be focused on a focal plane of the lens. In such an embodiment, a viewing window allowing the user to watch the hologram image HI may be formed at a user's position by the second optical system FL.

The spatial light modulator SLM may be configured to spatially modulate the planar light beam using diffraction phenomenon. In an embodiment, the spatial light modulator SLM may be configured to change a phase of the planar light beam incident thereto. The spatial light modulator SLM may be a display panel including a plurality of pixels, which are two-dimensionally arranged. In an embodiment, the display panel may be a transmission-type liquid crystal display panel.

A distance Pd between pixels in the spatial light modulator SLM may serve as a parameter for determining a diffraction angle of the light. The smaller the distance Pd between the pixels is, the larger the diffraction angle becomes, and an increase of the diffraction angle may lead to an increase in viewing angle of the hologram display device HD1. However, the method of reducing the distance Pd between the pixels may not be effective in increasing the viewing angle of the hologram display device HD1 due to various technical difficulties in reducing the distance Pd between the pixels.

The hologram display device HD1 may further include a sensing unit SP, which is used to sense a position of a user watching the hologram image HI, and a light source driving unit LDP, which selectively turns on at least one of the light sources LS1, LS2, and LS3 based on the position information of the user obtained by the sensing unit SP.

The sensing unit SP may include a pupil tracing sensor that traces the pupil of the user. The sensing unit SP may produce information on a position of the user (or the user's position information) through a sensing operation. The user's position information may be directly provided to the light source driving unit LDP, or a signal, which is obtained by processing the user's position information using a processor, may be provided to the light source driving unit LDP.

The light source driving unit LDP may selectively turns on at least one of the light sources LS1, LS2, and LS3 in response to a signal, in which the user's position information is contained. Even when the position of the user is changed, at least one of the light sources LS1, LS2, and LS3 may be adaptively chosen based on the changed position of the user to allow the user to watch the hologram image HI precisely at the changed position of the user. Accordingly, a viewing angle of the hologram display device HD1 may be increased.

FIGS. 3A to 3C are sectional views of the hologram display device, taken along line II-II' of FIG. 1. More particularly, FIG. 3A is a sectional view illustrating an operation of the hologram display device when a user watches a hologram image at a reference position, FIG. 3B is a sectional view illustrating an operation of the hologram display device when the user watches the hologram image at a first position, and FIG. 3C is a sectional view illustrating an operation of the hologram display device when the user watches the hologram image at a second position.

Referring to FIG. 3A, the light source unit LSP may include the light sources LS1, LS2, and LS3, which are mounted on the mounting substrate MS and are arranged in the first direction DR1. In an embodiment, the light sources LS1, LS2, and LS3 may include a first light source LS1, a second light source LS2, and a third light source LS3. The first light source LS1 may be disposed at a position corresponding to a center of the first optical system CL. The first light source LS1 may be a reference light source which is activated when the user watches the hologram image HI (e.g., of FIG. 2) at a reference position f1.

The second light source LS2 may be defined as a light source located at a first side of the first light source LS1. The second light source LS2 may include one or more light sources LS2-1, LS2-2, and LS2-3. In such an embodiment, the light source unit LSP may include one or more second light sources LS2-1, LS2-2, and LS2-3. The third light source LS3 may be defined as a light source located at a second side of the first light source LS1. The third light source LS3 may include one or more light sources LS3-1, LS3-2, and LS3-3. In such an embodiment, the light source unit LSP may include one or more third light sources LS3-1, LS3-2, and LS3-3.

When the user is located at the reference position f1, the light source driving unit LDP may turn on the first light source LS1 of the light sources LS1, LS2, and LS3 and may turn off the others (i.e., the second and third light sources LS2 and LS3). The reference position f1 may be coincident with a focal position focused by the second optical system FL when the first light source LS1 is in a turn-on state. For convenience in illustration and description, the reference position f1 is illustrated in FIG. 3A, but in such an embodiment, the first light source LS1 may be turned on, when the user is located within a reference region including the point corresponding to the reference position f1.

When the first light source LS1 is turned on, the light output from the first light source LS1 may be incident into the first optical system CL. The first optical system CL may include a convex lens surface CLS protruding in the second direction DR2. The light, which is incident through the convex lens surface CLS, may be converted to a collimated beam (hereinafter, a first collimated beam PL1) by the first optical system CL. The first collimated beam PL1 may be light that propagates in a direction perpendicular to the rear surface of the light guide plate LW.

The light passed though the light guide plate LW may be incident into the second optical system FL and may be focused on the reference position f1. Accordingly, the user may recognize the hologram image HI (e.g., of FIG. 2) at the reference position f1.

In such an embodiment, as shown in FIG. 3B, the user may move from the reference position f1 to a first position f2. Here, the moving direction of the user from the reference position f1 to the first position f2 may be defined as a first displacement direction LR1. In this case, the light source driving unit LDP may turn on one of the second light sources LS2-1, LS2-2, and LS2-3, which is spaced apart from the first light source LS1 in the first direction DR1. Here, the first direction DR1 may be opposite to the first displacement direction LR1. For convenience in illustration and description, the first position f2 is illustrated in FIG. 3B, but in such an embodiment, one of the second light sources LS2-1, LS2-2, and LS2-3 may be turned on, when the user is located within a first position region including the first position f2.

The light source driving unit LDP may select one of the second light sources LS2-1, LS2-2, and LS2-3 based on the distance between the reference position f1 and the first position f2. In such embodiment, when the distance between the reference position f1 and the first position f2 has a first value, for example, the light source driving unit LDP may select a light source from the second light sources LS2-1, LS2-2, and LS2-3, based on the first value. In such an embodiment, when one (e.g., LS2-2) of the second light sources LS2-1, LS2-2, and LS2-3 is selected and turned on, the remaining light sources LS1, LS2-1, LS2-3, LS3-1, LS3-2, and LS3-3 may be turned off.

When the second light source LS2-2 is turned on, light emitted from the light source LS2-2 may be incident into the first optical system CL. The first optical system CL may include the convex lens surface CLS protruding in the second direction DR2. The light emitted from the turned-on light source LS2-2 may be incident into the first optical system CL through the convex lens surface CLS and may be converted to a collimated beam (hereinafter, a second collimated beam PL2). The second collimated beam PL2 may be inclined at an angle to the first collimated beam PL1.

The light passed though the light guide plate LW may be incident into the second optical system FL and may be focused on the first position f2. Accordingly, the user may recognize the hologram image HI (e.g., of FIG. 2) at another position (i.e., the first position f2), which is not the reference position f1.

In such an embodiment, as shown in FIG. 3C, the user may move from the reference position f1 to a second position f3. Here, the moving direction of the user from the reference position f1 to the second position f3 may be defined as a second displacement direction LR2. The second displacement direction LR2 may be a direction that is opposite to the first displacement direction LR1 (e.g., of FIG. 3B). In this case, the light source driving unit LDP may turn on one of the third light sources LS3-1, LS3-2, and LS3-3, which is spaced apart from the first light source LS1 in a third direction DR3. Here, the third direction DR3 may be a direction that is opposite to the first direction DR1. In addition, the third direction DR3 may be a direction that is opposite to the second displacement direction LR2. For convenience in illustration and description, the second position f3 is illustrated in FIG. 3C, but in such an embodiment, one of the third light sources LS3-1, LS3-2, and LS3-3 may be turned on, when the user is located within a second position region including the second position f3.

The light source driving unit LDP may select one of the third light sources LS3-1, LS3-2, and LS3-3, based on the distance between the reference position f1 and the second position f3. In an embodiment, when the distance between the reference position f1 and the second position f3 has a second value, for example, the light source driving unit LDP may select a light source from the third light sources LS3-1, LS3-2, and LS3-3, based on the second value. In such an embodiment, when one (e.g., LS3-2) of the third light sources LS3-1, LS3-2, and LS3-3 is selected and turned on, the remaining light sources LS1, LS2-1, LS2-2, LS2-3, LS3-1, and LS3-3 may be turned off.

When the third light source LS3-2 is turned on, light emitted from the light source LS3-2 may be incident into the first optical system CL. The first optical system CL may include the convex lens surface CLS protruding in the second direction DR2. The light emitted from the turned-on light source LS3-2 may be incident into the first optical system CL through the convex lens surface CLS and may be converted to a collimated beam (hereinafter, a third collimated beam PL3). The third collimated beam PL3 may be inclined at an angle to the first collimated beam PL1.

The light passed though the light guide plate LW may be incident into the second optical system FL and may be focused on the second position f3. Accordingly, the user may recognize the hologram image HI (e.g., of FIG. 2) at another position (i.e., the second position f3), which is not the reference position f1.

Figure 4B:
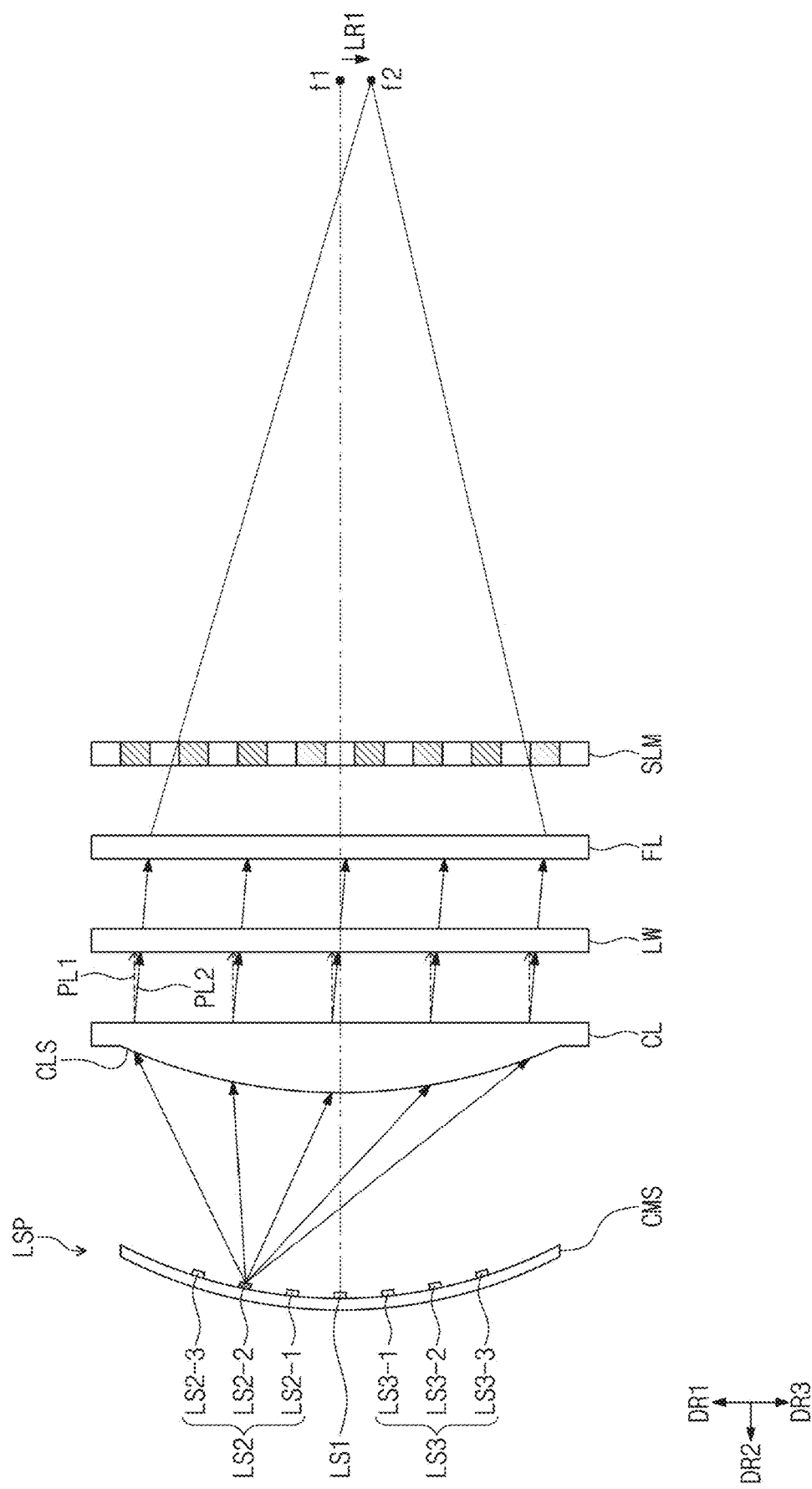
Figure 4C:
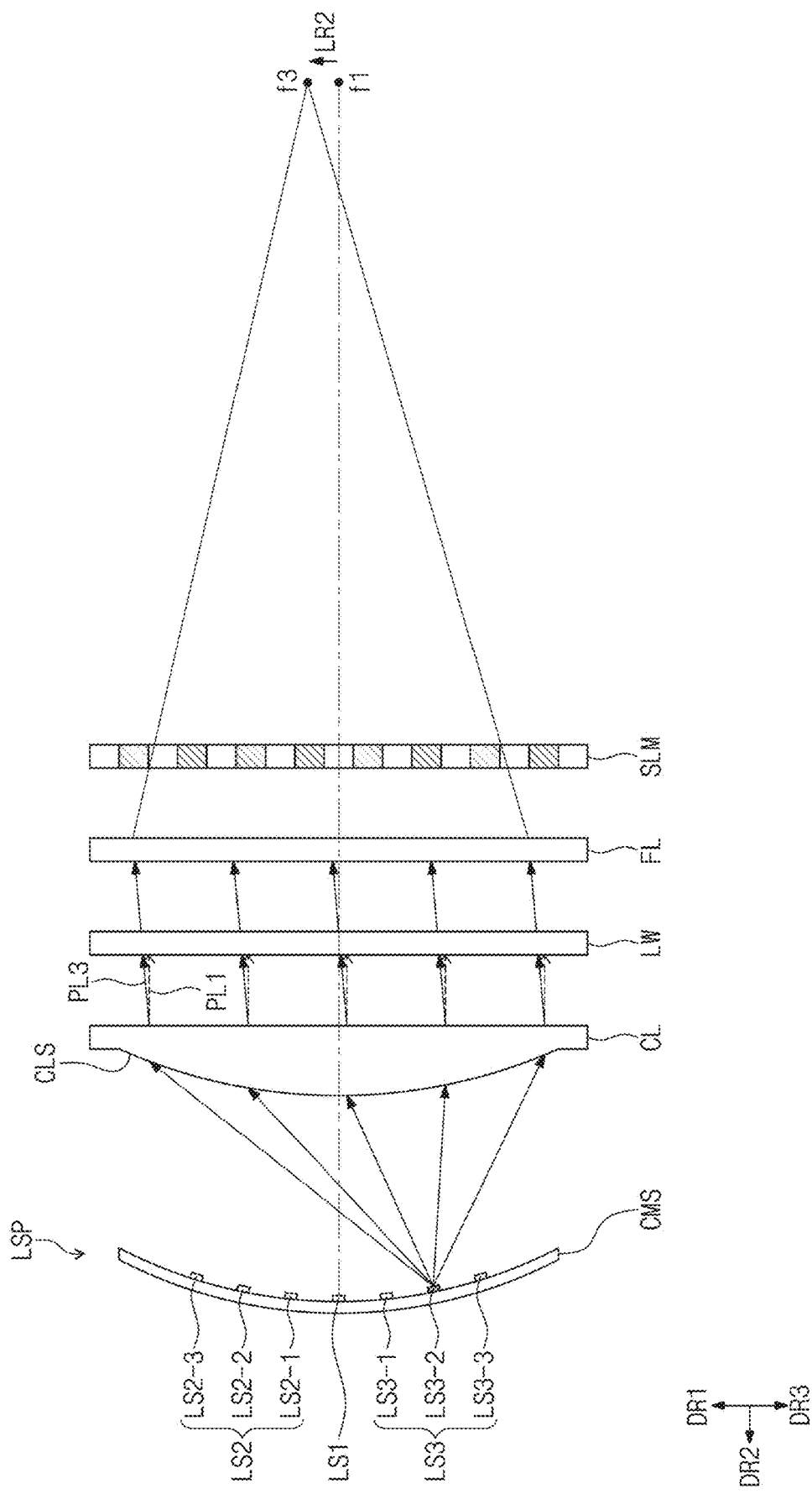

FIGS. 4A to 4C are sectional views illustrating a hologram display device according to an alternative embodiment of the invention. More particularly, FIG. 4A is a sectional view illustrating an operation of the hologram display device when a user watches a hologram image at a reference position, FIG. 4B is a sectional view illustrating an operation of the hologram display device when the user watches a hologram image at a first position, and FIG. 4C is a sectional view illustrating an operation of the hologram display device when the user watches a hologram image at a second position.

Referring to FIG. 4A, in an embodiment, the light source unit LSP may include a curved mounting substrate CMS and the light sources LS1, LS2, and LS3, which are mounted on the curved mounting substrate CMS and are arranged in the first direction DR1. The curved mounting substrate CMS may be a structure that is curved in the first direction DR1 with a predetermined curvature. In an embodiment, the curved mounting substrate CMS may have a curvature corresponding to the convex lens surface CLS of the first optical system CL.

In an embodiment, the light sources LS1, LS2, and LS3 may include the first light source LS1, the second light source LS2, and the third light source LS3. The first light source LS1 may be disposed at a position corresponding to a center of the first optical system CL. The first light source LS1 may be a reference light source which is activated when the user watches the hologram image HI at the reference position f1.

In such an embodiment, as shown in FIG. 4A, when the user is located at the predetermined reference position f1, the light source driving unit LDP may turn on the first light source LS1 of the light sources LS1, LS2, and LS3 and may turn off the others (i.e., LS2 and LS3). The reference position f1 may be coincident with a focal position focused by the second optical system FL when the first light source LS1 is in a turn-on state.

When the first light source LS1 is turned on, the light output from the first light source LS1 may be incident into the first optical system CL. The first optical system CL may include the convex lens surface CLS protruding in the second direction DR2. The light, which is incident through the convex lens surface CLS, may be converted to a collimated beam (hereinafter, the first collimated beam PL1) by the first optical system CL. The first collimated beam PL1 may be light that propagates in a direction perpendicular to the rear surface of the light guide plate LW.

The light passed though the light guide plate LW may be incident into the second optical system FL and may be focused on the reference position f1. Accordingly, the user may recognize the hologram image HI (e.g., of FIG. 2) at the reference position f1.

In such an embodiment, as shown in FIG. 4B, the user may move from the reference position f1 to the first position f2. In this case, the light source driving unit LDP may turn on one of the second light sources LS2-1, LS2-2, and LS2-3, which is spaced apart from the first light source LS1 in the first direction DR1.

The light source driving unit LDP may select one of the second light sources LS2-1, LS2-2, and LS2-3, based on the distance between the reference position f1 and the first position f2. When one (e.g., LS2-2) of the second light sources LS2-1, LS2-2, and LS2-3 is selected and turned on, the remaining light sources LS1, LS2-1, LS2-3, LS3-1, LS3-2, and LS3-3 may be turned off.

When the second light source LS2-2 is turned on, light emitted from the light source LS2-2 may be incident into the first optical system CL. Here, since the curved mounting substrate CMS has a curved shape corresponding to the convex lens surface CLS, light beams emitted from the second light sources LS2-1, LS2-2, and LS2-3 may be effectively incident into the convex lens surface CLS.

The light emitted from the turned-on light source LS2-2 may be incident into the first optical system CL through the convex lens surface CLS and may be converted to a collimated beam (hereinafter, a second collimated beam PL2). The second collimated beam PL2 may be inclined at an angle to the first collimated beam PL1.

The light passed though the light guide plate LW may be incident into the second optical system FL and may be focused on the first position f2. Accordingly, the user may recognize the hologram image HI (e.g., of FIG. 2) at another position (i.e., the first position f2), which is not the reference position f1.

In such an embodiment, as shown in FIG. 4C, the user may move from the reference position f1 to the second position f3. In this case, the light source driving unit LDP may turn on one of the third light sources LS3-1, LS3-2, and LS3-3, which is spaced apart from the first light source LS1 in the third direction DR3.

The light source driving unit LDP may select one of the third light sources LS3-1, LS3-2, and LS3-3, based on the distance between the reference position f1 and the second position f3. In such an embodiment, when one (e.g., LS3-2) of the third light sources LS3-1, LS3-2, and LS3-3 is selected and turned on, the remaining light sources LS1, LS2-1, LS2-2, LS2-3, LS3-1, and LS3-3 may be turned off.

When the third light source LS3-2 is turned on, light emitted from the light source LS3-2 may be incident into the first optical system CL. In such an embodiment, since the curved mounting substrate CMS has a curved shape corresponding to the convex lens surface CLS, light beams emitted from the third light sources LS3-1, LS3-2, and LS3-3 may be effectively incident into the convex lens surface CLS.

The light emitted from the turned-on light source LS3-2 may be incident into the first optical system CL through the convex lens surface CLS and may be converted to a collimated beam (hereinafter, the third collimated beam PL3). The third collimated beam PL3 may be inclined at an angle to the first collimated beam PL1.

The light passed though the light guide plate LW may be incident into the second optical system FL and may be focused on the second position f3. Accordingly, the user may recognize the hologram image HI (e.g., of FIG. 2) at another position (i.e., the second position f3), which is not the reference position f1.

Figure 5:
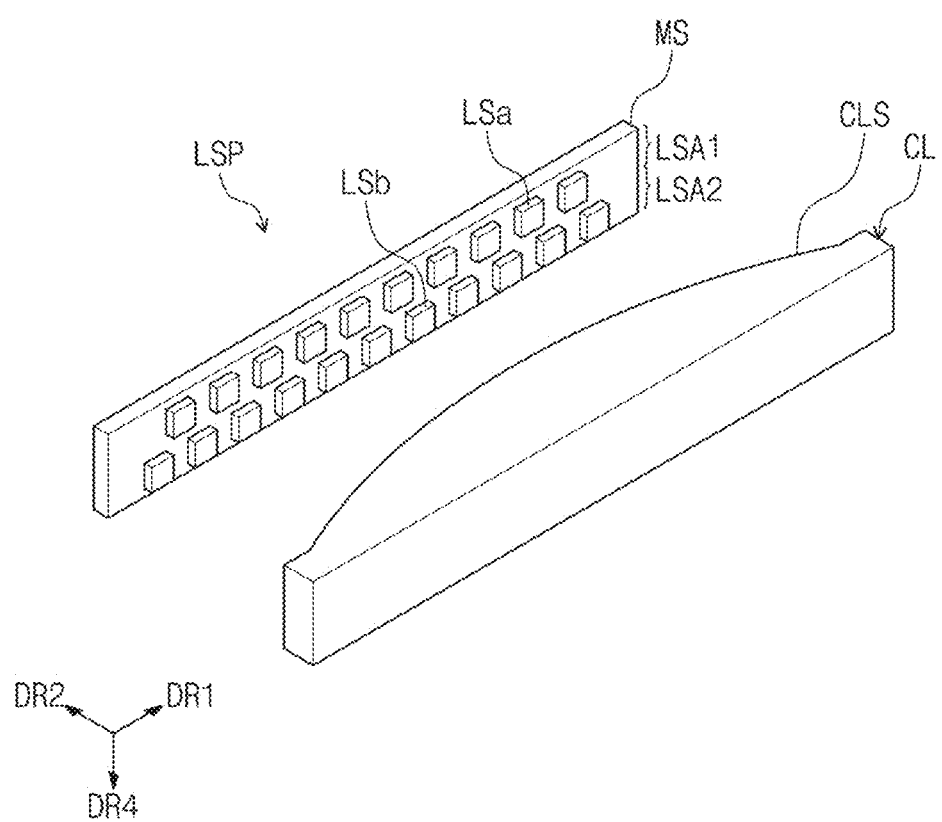
FIG. 5 is a perspective view illustrating a light source unit according to an embodiment of the invention.
Figure 6A:
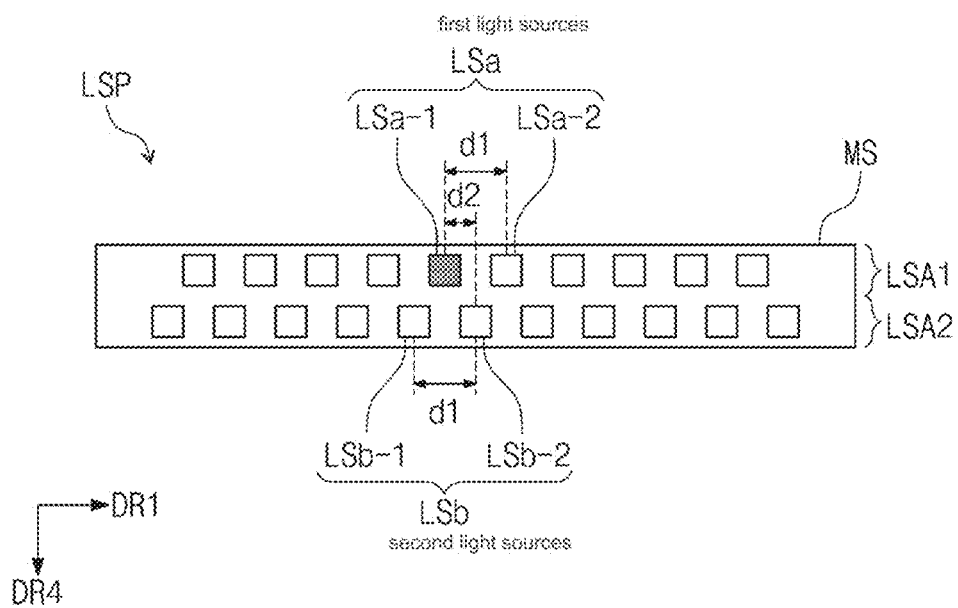
FIGS. 6A and 6B are plan views illustrating the light source unit of FIG. 5.

FIG. 5 is a perspective view illustrating a light source unit according to an embodiment of the invention. FIG. 6A is a plan view illustrating the light source unit, when one of light sources in a first light source array is turned on, and FIG. 6B is a plan view illustrating the light source unit, when one of light sources in a second light source array is turned on.

Figure 6B:
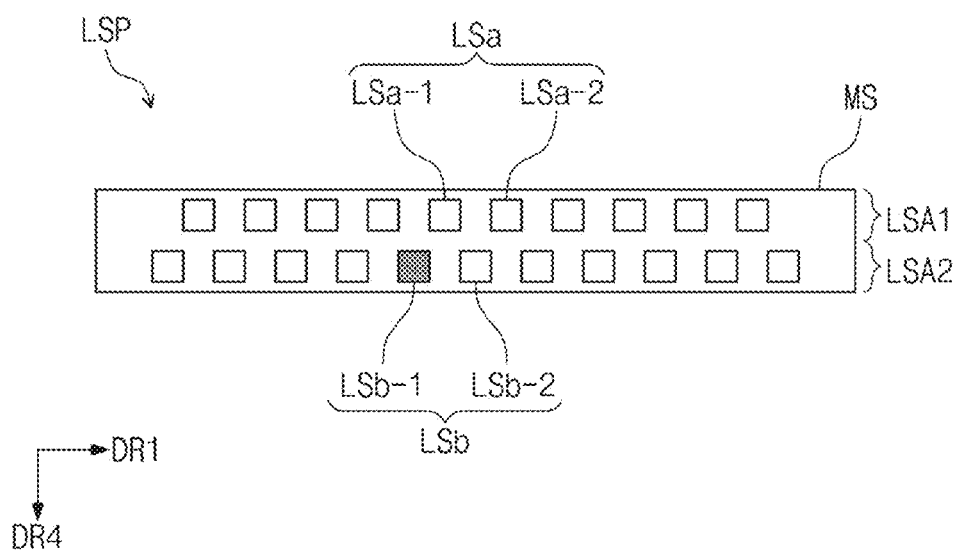

Referring to FIGS. 5, 6A, and 6B, an embodiment of the light source unit LSP may include the mounting substrate MS, a first light source array LSA1, and a second light source array LSA2. The first light source array LSA1 may include a plurality of first light sources LSa arranged in the first direction DR1, and the second light source array LSA2 may include a plurality of second light sources LSb arranged in the first direction DR1. The first and second light source arrays LSA1 and LSA2 may be arranged in a fourth direction DR4, which is orthogonal to the first direction DR1.

FIG. 5 illustrates an embodiment, in which the light source unit LSP includes two light source arrays LSA1 and LSA2, but the invention is not limited to this example. In one embodiment, for example, the light source unit LSP may include a plurality of light source arrays, e.g., three or four light source arrays, arranged in the fourth direction DR4.

The first optical system CL may include the convex lens surface CLS protruding in the second direction DR2. The convex lens surface CLS of the first optical system CL may face emission surfaces of the first and second light sources LSa and LSb.

In such an embodiment, as shown in FIGS. 6A and 6B, the first light sources LSa included in the first light source array LSA1 may be arranged in the first direction DR1 to be spaced apart from each other by a predetermined distance. In one embodiment, for example, first light sources LSa-1 and LSa-2, which are two adjacent ones of the first light sources LSa, may be spaced apart from each other by a first distance d1. Hereinafter, for convenience in description, the first light sources LSa-1 and LSa-2, which are adjacent to each other, will be referred to as a first sub-light source LSa-1 and a second sub-light source LSa-2.

In such an embodiment, the second light sources LSb included in the second light source array LSA2 may be arranged in the first direction DR1 to be spaced apart from each other by a predetermined distance. In one embodiment, for example, second light sources LSb-1 and LSb-2, which are two adjacent ones of the second light sources LSb, may be spaced apart from each other by the first distance d1. Hereinafter, for convenience in description, the second light sources LSb-1 and LSb-2, which are adjacent to each other, will be referred to as a third sub-light source LSb-1 and a fourth sub-light source LSb-2.

In an embodiment, as shown in FIGS. 6A and 6B, the first light sources LSa-1 and LSa-2 and the second light sources LSb-1 and LSb-2 may be alternately disposed with each other in a zig-zag form. In such an embodiment, each of the second light sources LSb-1 and LSb-2 may be disposed in a region corresponding to a gap region between a corresponding pair of the first light sources LSa-1 adjacent to each other (e.g., the first light sources LSa-1 and LSa-2). In one embodiment, for example, the fourth sub-light source LSb-2 may be disposed to correspond to a gap region between the first and second sub-light sources LSa-1 and LSa-2, and the first sub-light source LSa-1 may be disposed to correspond to a gap region between the third and fourth sub-light sources LSb-1 and LSb-2. Thus, each of the first light sources LSa may be spaced apart from a corresponding one of the second light sources LSb by a distance in the first direction DR1, e.g., a second distance d2, smaller than the first distance d1. In one embodiment, for example, the first and fourth sub-light sources LSa-1 and LSb-2 may be spaced apart from each other in the first direction DR1 by the second distance d2, and the first and third sub-light sources LSa-1 and LSb-1 may be spaced apart from each other in the first direction DR1 by the second distance d2.

Since the movement of the user may be continuous but the first light sources LSa of the first light source array LSA1 are spaced apart from each other by the distance d1, there may be a dead space, in which the hologram image HI (e.g., of FIG. 2) cannot be normally recognized, between viewing regions that are respectively covered by the first light sources LSa. Accordingly, it may be desired to reduce the distance between the first light sources LSa to reduce a size of the dead space.

However, there may be a limitation in reducing the distance between the light sources in a same light source array. According to an embodiment of the invention, the second light source LSb of the second light source array LSA2 may be disposed in a region corresponding to a gap region between the first light sources LSa of the first light source array LSA1 to achieve substantially the same effect as in the light sources that are arranged with a substantially shot interval. In such an embodiment, the distance d2 between the first and third sub-light sources LSa-1 and LSb-1 may be reduced to a value that is about half the distance d1 between the first and second sub-light sources LSa-1 and LSa-2. As a result, it may be possible to reduce a size of a dead space, which is formed between viewing regions when the first and third sub-light sources LSa-1 and LSb-1 are respectively turned on.

FIGS. 5 to 6B illustrate an embodiment, in which the mounting substrate MS has a flat planar structure, but the invention is not limited thereto. In one alternative embodiment, for example, the mounting substrate MS may have a structure which is curved or bent along the convex lens surface CLS of the first optical system CL.

Figure 7:
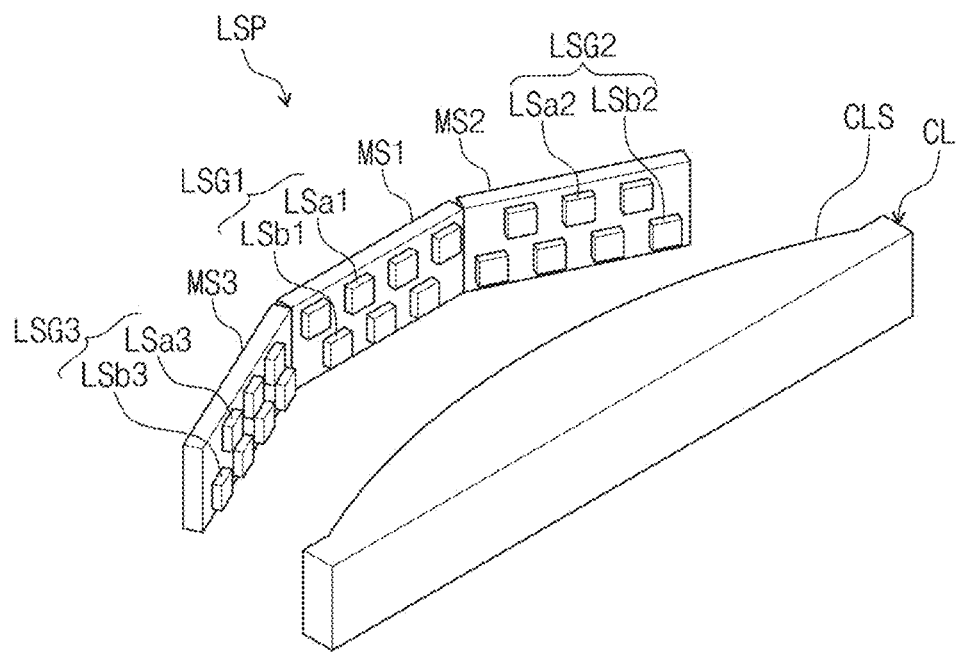
FIG. 7 is a perspective view illustrating a light source unit according to an alternative embodiment of the invention.
Figure 8:
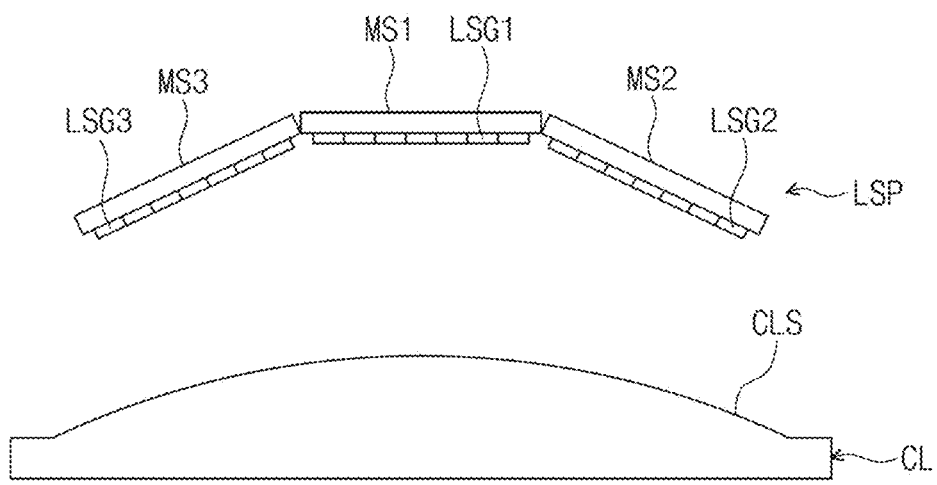
FIG. 8 is a plan view illustrating the light source unit and the first optical system shown in FIG. 7.

FIG. 7 is a perspective view illustrating a light source unit according to an alternative embodiment of the invention, and FIG. 8 is a plan view illustrating the light source unit and the first optical system shown in FIG. 7.

Referring to FIGS. 7 and 8, an embodiment of the light source unit LSP may include a first mounting substrate MS1, a second mounting substrate MS2, and a third mounting substrate MS3. The light source unit LSP may include a first light source group LSG1 mounted on the first mounting substrate MS1, a second light source group LSG2 mounted on the second mounting substrate MS2, and a third light source group LSG3 mounted on the third mounting substrate MS3.

The first optical system CL may include the convex lens surface CLS protruding in the second direction DR2. The first mounting substrate MS1 may be disposed to correspond to a center portion of the convex lens surface CLS, the second mounting substrate MS2 may be disposed to correspond to one side of the center portion, and the third mounting substrate MS3 may be disposed to correspond to an opposite side of the center portion.

The second mounting substrate MS2 may be disposed to be inclined at an angle to the first mounting substrate MS1, and the third mounting substrate MS3 may be disposed to be inclined at an angle to the first mounting substrate MS1. Each of the first to third mounting substrates MS1, MS2, and MS3 may have a flat planar structure. Since the second and third mounting substrates MS2 and MS3 are disposed to be inclined at an angle to the first mounting substrate MS1, it may be possible to effectively provide light, which is generated by light sources, to the convex lens surface CLS, as in an embodiment where the mounting substrate is curvedly formed along the convex lens surface CLS.

Each of the first to third light source groups LSG1, LSG2, and LSG3 may have a structure similar to the first and second light source arrays LSA1 and LSA2 shown in FIGS. 5 to 6B. In one embodiment, for example, the first light source group LSG1 may include first and second light source arrays LSa1 and LSb1, the second light source group LSG2 may include third and fourth light source arrays LSa2 and LSb2, and the third light source group LSG3 may include fifth and sixth light source arrays LSa3 and LSb3.

The first to third light source groups LSG1-LSG3 may be configured to have substantially the same structure as the first and second light source arrays LSA1 and LSA2 described above with reference to FIGS. 5 to 6B, and thus any repetitive detailed description of the first to third light source groups LSG1-LSG3 will be omitted.

Figure 9:
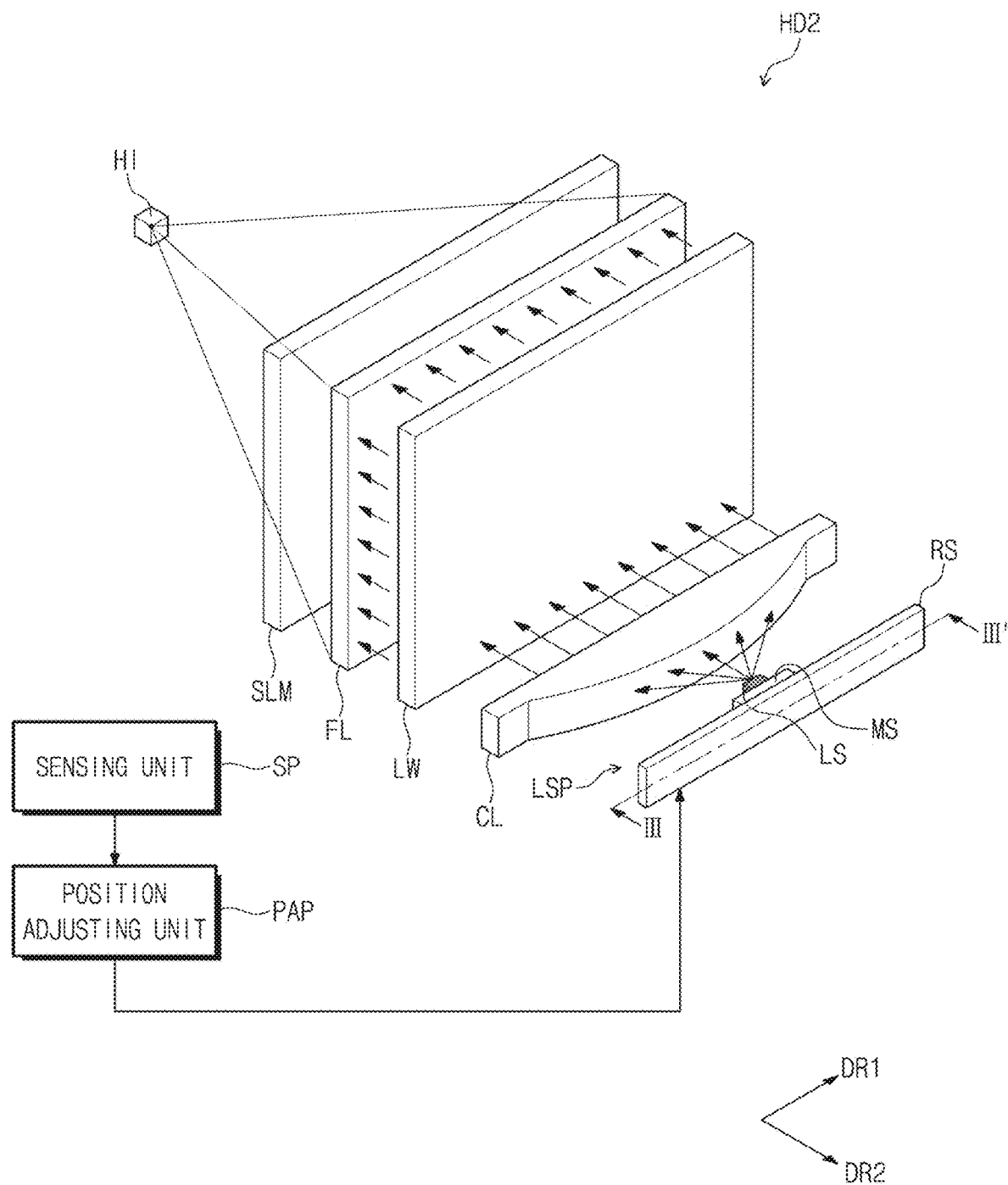
FIG. 9 is a conceptual diagram illustrating a hologram display device according to an alternative embodiment of the invention.
Figure 10A:
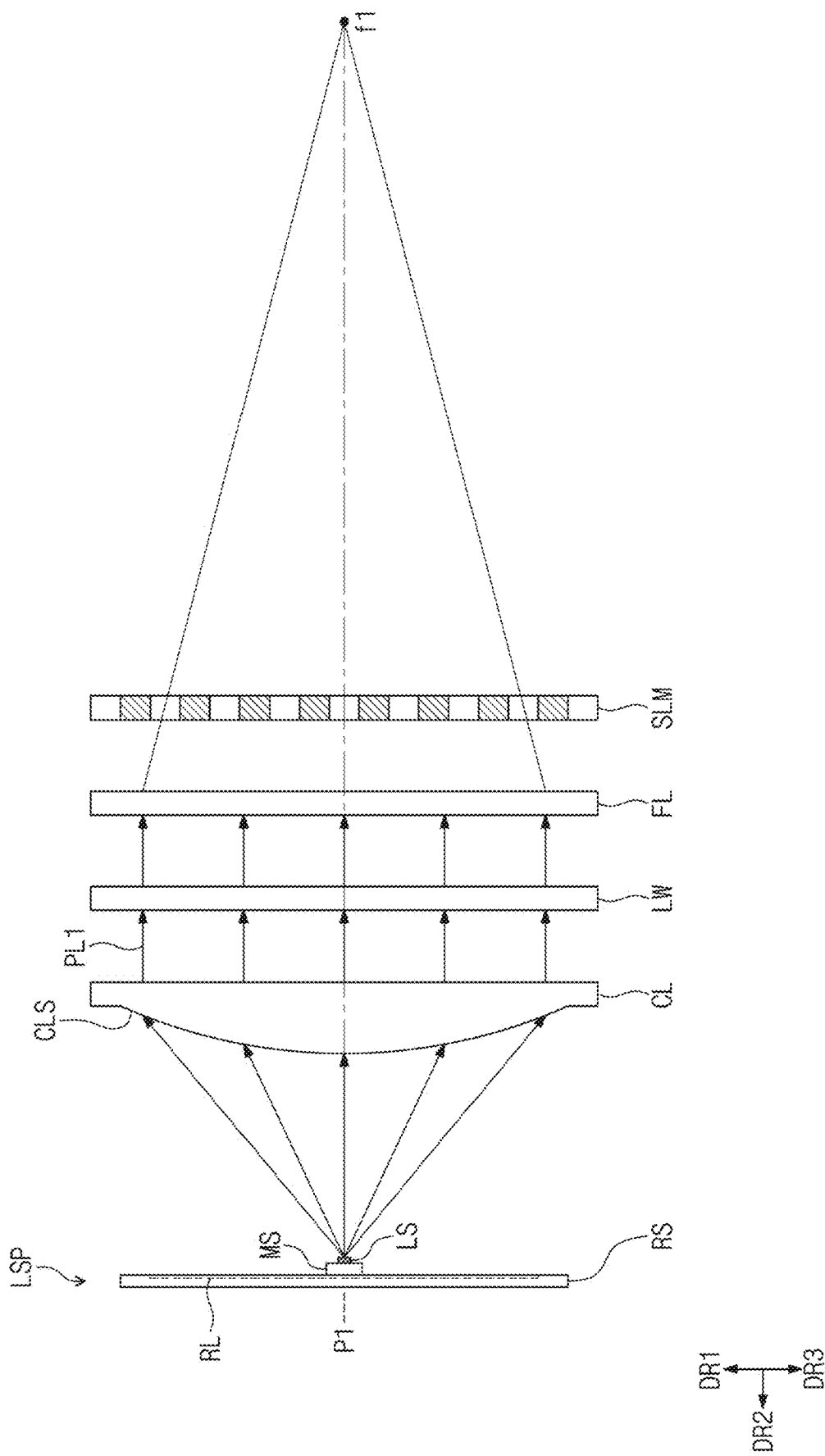
Figure 10B:
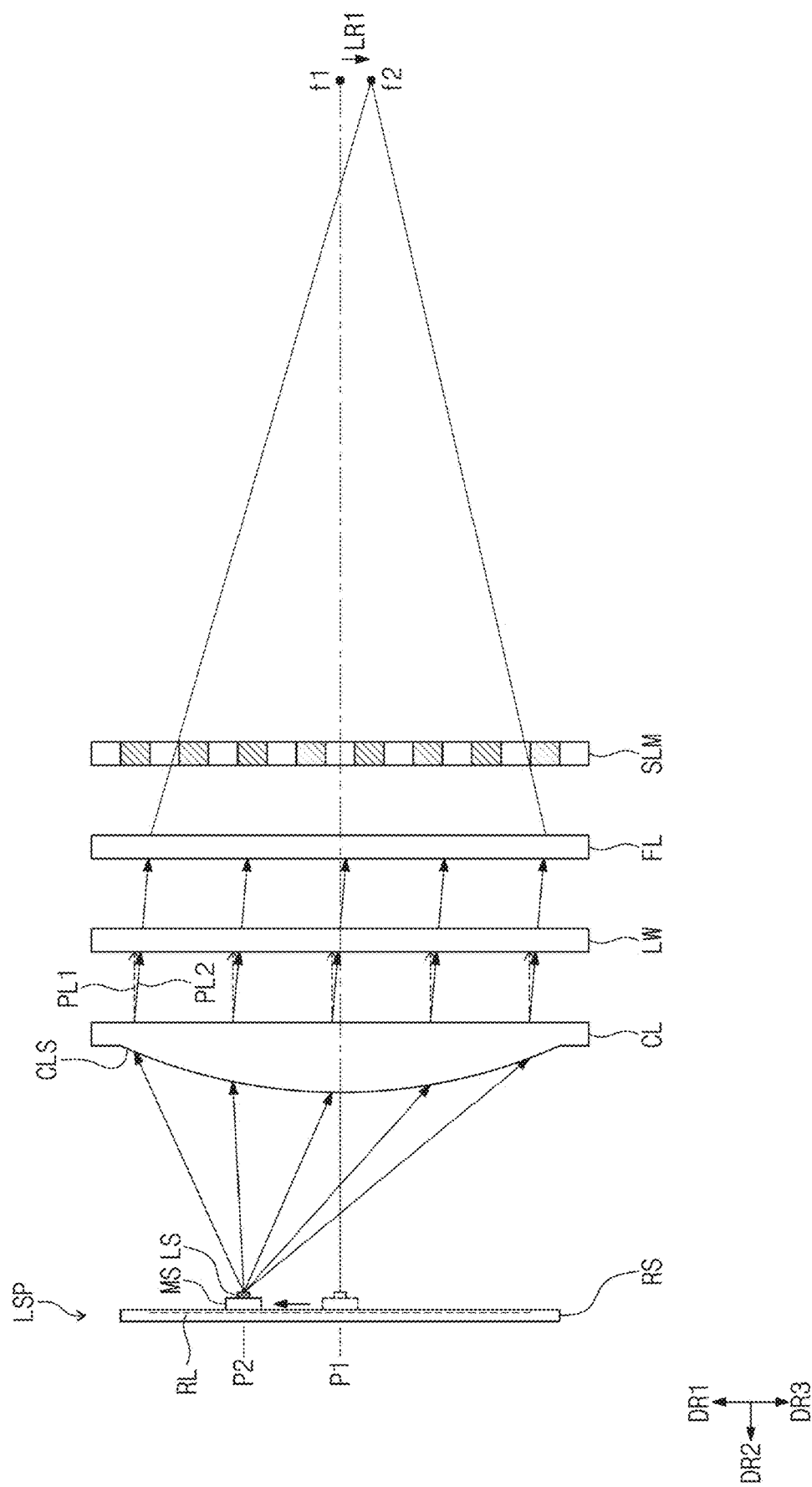

FIG. 9 is a conceptual diagram illustrating a hologram display device according to an alternative embodiment of the invention, and FIGS. 10A to 10C are sectional views of the hologram display device, taken along line of FIG. 9.

The hologram display device HD2 in FIGS. 9 to 10C is substantially the same as the hologram display device shown in FIGS. 1 to 3C except for the light source unit LSP. The same or like elements shown in FIGS. 9 to 10C have been labeled with the same reference characters as used above to describe the embodiments of the hologram display device shown in FIGS. 1 to 3C, and any repetitive detailed description thereof will hereinafter be omitted or simplified.

Referring to FIG. 9, in an embodiment, the light source unit LSP may include a rail substrate RS, the mounting substrate MS, which is equipped to be movable on the rail substrate RS, and a light source LS, which is mounted on the mounting substrate MS.

In such an embodiment, the hologram display device HD2 may include the sensing unit SP, which senses a position of a user watching the hologram image HI, and a position adjusting unit PAP, which is configured to adjust a position of the light source LS, based on information on the position of the user obtained by the sensing unit SP.

The sensing unit SP may include a pupil tracing sensor that traces the pupil of the user. The sensing unit SP may generate the information on the position of the user (or the user's position information) through a sensing operation. The user's position information may be directly provided to the position adjusting unit PAP, or a signal, which is obtained by processing the user's position information using a processor, may be provided to the position adjusting unit PAP.

The position adjusting unit PAP may move the light source LS to a predetermined position, in response to a signal, in which the user's position information is contained. Accordingly, even when the watching position of the user is changed, the position of the light source may be adaptively adjusted based on the changed position of the user to allow the user to watch the hologram image HI precisely at the changed position of the user. Accordingly, in such an embodiment, the viewing angle of the hologram display device HD2 may be increased.

FIG. 10A is a sectional view illustrating an operation of the hologram display device when a user watches a hologram image at a reference position, FIG. 10B is a sectional view illustrating an operation of the hologram display device when a user watches a hologram image at a first position, and FIG. 10C is a sectional view illustrating an operation of the hologram display device when a user watches a hologram image at a second position.

Referring to FIG. 10A, a rail RL extending in the first direction DR1 may be provided on the rail substrate RS. The mounting substrate MS, on which the light source LS is mounted, may be equipped on the rail substrate RS to be movable along the rail RL. In such an embodiment, the light source LS may move along the rail RL on the rail substrate RS in the first and third directions DR1 and DR3 opposite to each other.

The light source LS may be disposed at a first light-emitting position P1 corresponding to a center of the first optical system CL. The light source LS may be disposed at the first light-emitting position P1, when the user watches the hologram image HI (e.g., of FIG. 2) at the reference position f1.

When the user is located at the predetermined reference position f1, the light source LS may be turned on at the first light-emitting position P1. For convenience in illustration and description, the reference position f1 is illustrated in FIG. 10A, but in such an embodiment, the light source LS may be turned on at the first light-emitting position P1, when the user is located within a reference region including the reference position f1.

When the light source LS is turned on at the first light-emitting position P1, the light emitted from the light source LS may be incident into the first optical system CL. The first optical system CL may include the convex lens surface CLS protruding in the second direction DR2. The light emitted from the light source LS at the first light-emitting position P1 may be incident into the first optical system CL through the convex lens surface CLS and may be converted to a collimated beam (hereinafter, the first collimated beam PL1). The first collimated beam PL1 may be light that propagates in a direction perpendicular to the rear surface of the light guide plate LW.

The light passed though the light guide plate LW may be incident into the second optical system FL and may be focused on the reference position f1. Accordingly, the user may recognize the hologram image HI (e.g., of FIG. 2) at the reference position f1.

In such an embodiment, as shown in FIG. 10B, the user may move from the reference position f1 to the first position f2. Here, the moving direction of the user from the reference position f1 to the first position f2 may be defined as the first displacement direction LR1. In this case, the position adjusting unit PAP may move the light source LS in the first direction DR1. Here, the first direction DR1 may be opposite to the first displacement direction LR1. For convenience in illustration and description, the first position f2 is illustrated in FIG. 10B, but in such an embodiment, the light source LS may be moved to a second light-emitting position P2, when the user is located within a first position region including the first position f2.

The position adjusting unit PAP may adjust the distance between the first and second light-emitting positions P1 and P2 based on, e.g., in proportion to, the distance between the reference position f1 and the first position f2.

When the light source LS is turned on at the second light-emitting position P2, the light emitted from the light source LS may be incident into the first optical system CL. The first optical system CL may include the convex lens surface CLS protruding in the second direction DR2. The light emitted from the light source LS at the second light-emitting position P2 may be incident into the first optical system CL through the convex lens surface CLS and may be converted to a collimated beam (hereinafter, the second collimated beam PL2). The second collimated beam PL2 may be inclined at an angle to the first collimated beam PL1.

The light passed though the light guide plate LW may be incident into the second optical system FL and may be focused on the first position f2. Accordingly, the user may recognize the hologram image HI (e.g., of FIG. 2) at another position (i.e., the first position f2), which is not the reference position f1.

In such an embodiment, as shown in FIG. 10C, the user may move from the reference position f1 to the second position f3. Here, the moving direction of the user from the reference position f1 to the second position f3 may be defined as the second displacement direction LR2. The second displacement direction LR2 may be a direction that is opposite to the first displacement direction LR1. In this case, the position adjusting unit PAP may move the light source LS in the third direction DR3. Here, the third direction DR3 may be a direction that is opposite to the first direction DR1. In addition, the third direction DR3 may be a direction that is opposite to the second displacement direction LR2. For convenience in illustration and description, the second position f3 is illustrated in FIG. 10C, but in such an embodiment, the light source LS may be moved to a third light-emitting position P3, when the user is located within a second position region including the second position f3.

The position adjusting unit PAP may adjust the distance between the first and third light-emitting positions P1 and P3 based on, e.g., in proportion to, the distance between the reference position f1 and the first position f2.

When the light source LS is turned on at the third light-emitting position P3, the light emitted from the light source LS may be incident into the first optical system CL. The first optical system CL may include the convex lens surface CLS protruding in the second direction DR2. The light emitted from the light source LS at the third light-emitting position P3 may be incident into the first optical system CL through the convex lens surface CLS and may be converted to a collimated beam (hereinafter, the third collimated beam PL3). The third collimated beam PL3 may be inclined at an angle to the first collimated beam PL1.

The light passed though the light guide plate LW may be incident into the second optical system FL and may be focused on the second position f3. Accordingly, the user may recognize the hologram image HI (e.g., of FIG. 2) at another position (i.e., the second position f3), which is not the reference position f1.

Figure 11A:
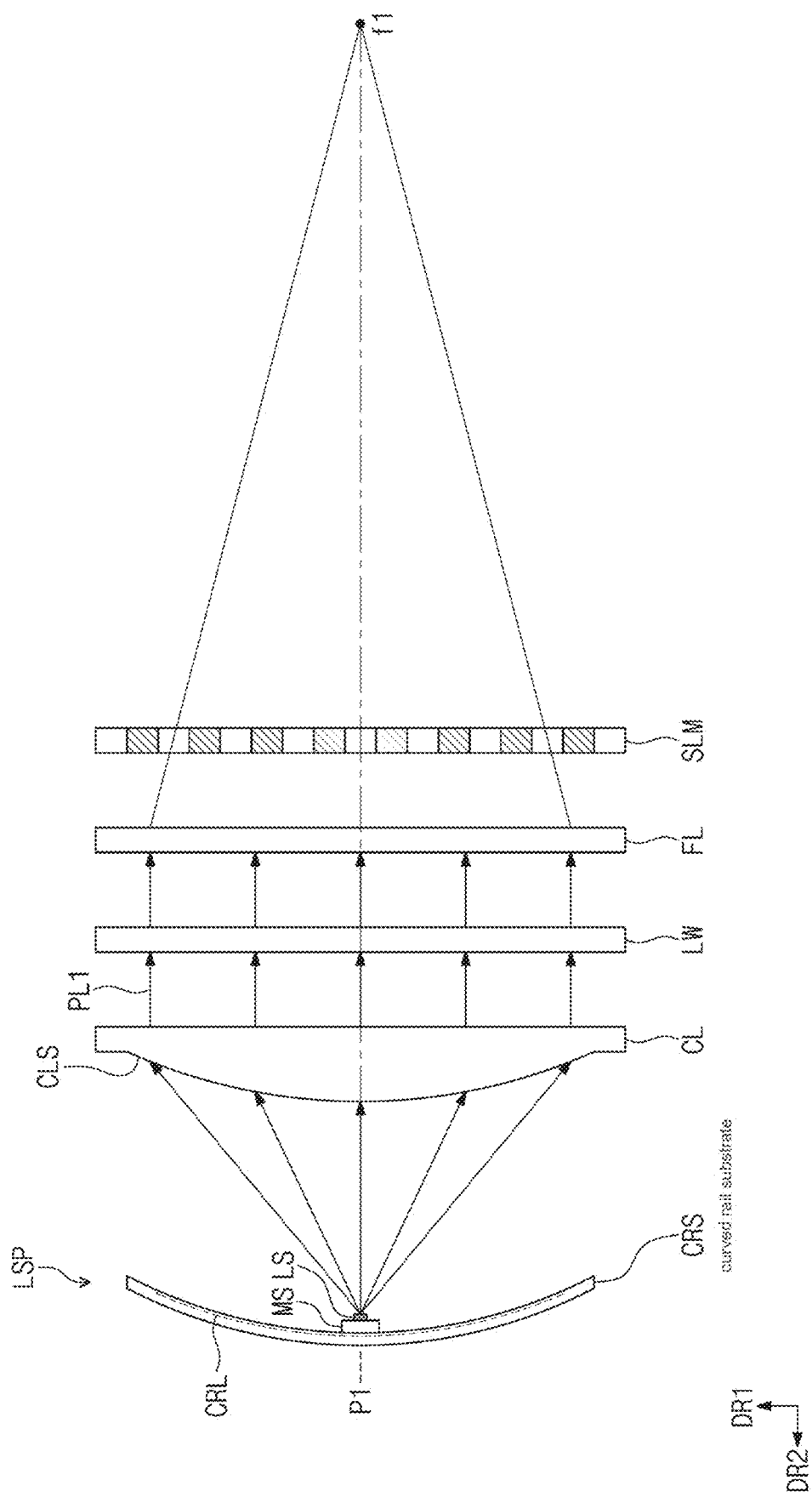
Figure 11B:
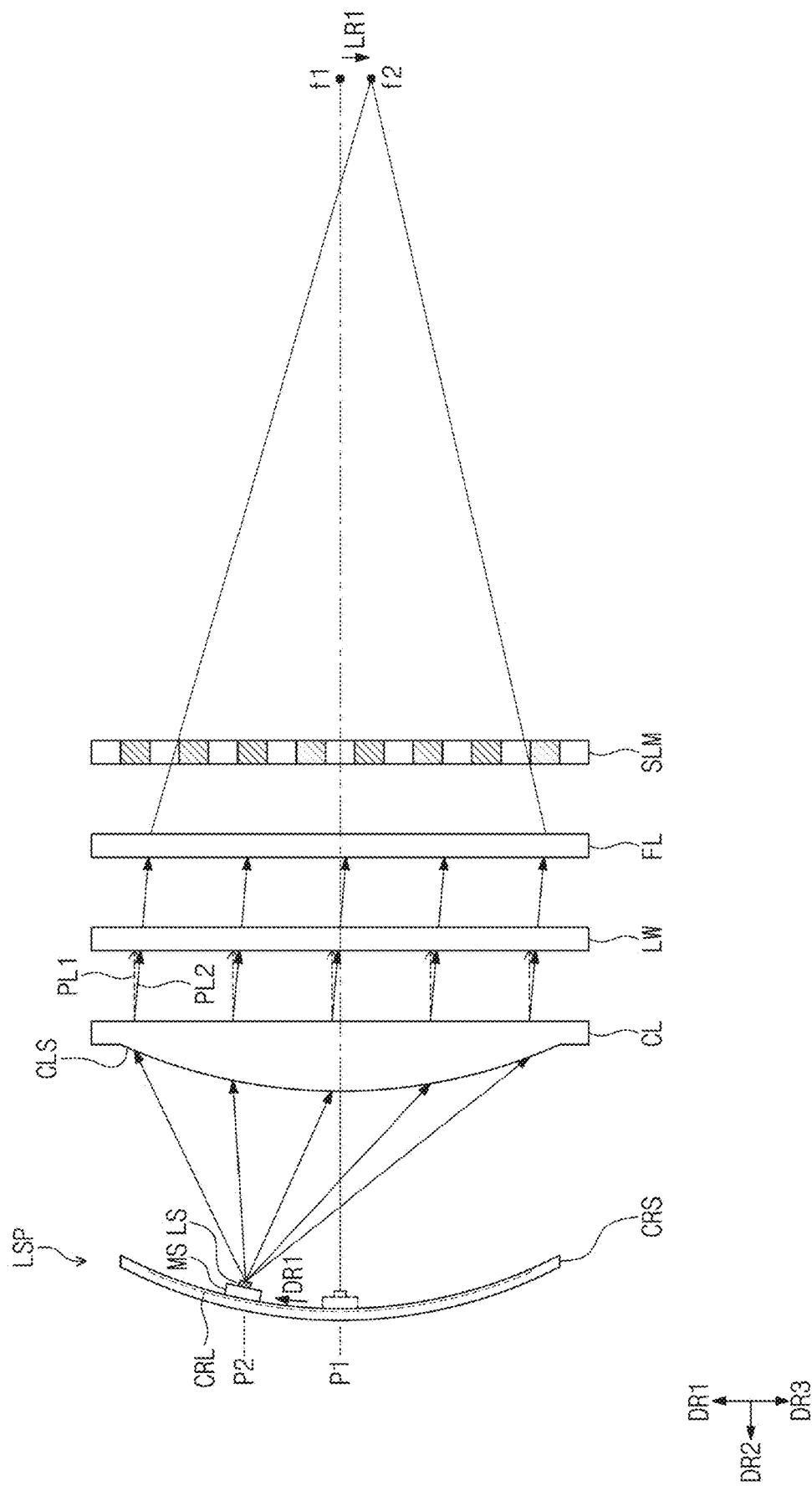

FIGS. 11A to 11C are sectional views illustrating a hologram display device according to another alternative embodiment of the invention. More particularly, FIG. 11A is a sectional view illustrating an operation of the hologram display device when a user watches a hologram image at a reference position, FIG. 11B is a sectional view illustrating an operation of the hologram display device when the user watches a hologram image at a first position, and FIG. 11C is a sectional view illustrating an operation of the hologram display device when the user watches a hologram image at a second position.

Referring to FIG. 11A, an embodiment of the light source unit LSP may include a curved rail substrate CRS, a mounting substrate equipped to be movable on the curved rail substrate CRS, and the light source LS mounted on the mounting substrate. The curved rail substrate CRS may be a structure that is curved in the first direction DR1 with a specific curvature. In an embodiment, the curved rail substrate CRS may have a curvature corresponding to the convex lens surface CLS of the first optical system CL. The mounting substrate MS, on which the light source LS is mounted, may be equipped on the curved rail substrate CRS to be movable along a curved rail CRL of the curved rail substrate CRS.

When the user is located at the predetermined reference position f1, the light source LS may be turned on at the first light-emitting position P1. If the light source LS is turned on at the first light-emitting position P1, the light emitted from the light source LS may be incident into the first optical system CL. The first optical system CL may include the convex lens surface CLS protruding in the second direction DR2. The light emitted from the light source LS at the first light-emitting position P1 may be incident into the first optical system CL through the convex lens surface CLS and may be converted to a collimated beam (hereinafter, the first collimated beam PL1). The first collimated beam PL1 may be light that propagates in a direction perpendicular to the rear surface of the light guide plate LW.

The light passed though the light guide plate LW may be incident into the second optical system FL and may be focused on the reference position f1. Accordingly, the user may recognize the hologram image HI (e.g., of FIG. 2) at the reference position f1.

In such an embodiment, as shown in FIG. 11B, the user may move from the reference position f1 to the first position f2. The position adjusting unit PAP may adjust the distance between the first and second light-emitting positions P1 and P2, in proportion to the distance between the reference position f1 and the first position f2.

When the light source LS is turned on at the second light-emitting position P2, the light emitted from the light source LS may be incident into the first optical system CL. Here, since the curved rail substrate CRS has a curved shape corresponding to the convex lens surface CLS, a light beam emitted from the light source LS at the second light-emitting position P2 may be effectively incident into the convex lens surface CLS. The light emitted from the light source LS at the second light-emitting position P2 may be incident into the first optical system CL through the convex lens surface CLS and may be converted to a collimated beam (hereinafter, the second collimated beam PL2). The second collimated beam PL2 may be inclined at an angle to the first collimated beam PL1.

The light passed though the light guide plate LW may be incident into the second optical system FL and may be focused on the first position f2. Accordingly, the user may recognize the hologram image HI (e.g., of FIG. 2) at another position (i.e., the first position f2), which is not the reference position f1.

In such an embodiment, as shown in FIG. 11C, the user may move from the reference position f1 to the second position f3. The position adjusting unit PAP may adjust the distance between the first and third light-emitting positions P1 and P3, in proportion to the distance between the reference position f1 and the second position f3.

When the light source LS is turned on at the third light-emitting position P3, the light emitted from the light source LS may be incident into the first optical system CL. Here, since the curved rail substrate CRS has a curved shape corresponding to the convex lens surface CLS, a light beam emitted from the light source LS at the third light-emitting position P3 may be effectively incident into the convex lens surface CLS. The light emitted from the light source LS at the third light-emitting position P3 may be incident into the first optical system CL through the convex lens surface CLS and may be converted to a collimated beam (hereinafter, the third collimated beam PL3). The third collimated beam PL3 may be inclined at an angle to the first collimated beam PL1.

The light passed though the light guide plate LW may be incident into the second optical system FL and may be focused on the second position f3. Accordingly, the user may recognize the hologram image HI (e.g., of FIG. 2) at another position (i.e., the second position f3), which is not the reference position f1.

According to embodiments of the invention, when a position of a user is changed, a hologram display device may be configured to sense the changed position of the user and to selectively turn on one of light sources based on the user's position information, such that the user is allowed to watch the hologram image precisely at the changed position of the user. Accordingly, in such an embodiment, a viewing angle of the hologram display device is increased.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A hologram display device, comprising:
    a light source unit including a rail substrate, a mounting substrate equipped on the rail substrate to be movable, and a light source mounted on the mounting substrate to generate light;
    a light guide plate which converts the light emitted thereto from the light source unit to a planar light beam;
    a spatial light modulator which spatially modulates the planar light beam to produce a hologram image;
    a sensing unit which senses a position of a user;
    a position adjusting unit which adjusts a position of the light source, based on information on the position of the user obtained by the sensing unit;
    a first optical system disposed between the light guide plate and the light source unit,
    wherein
    the first optical system comprises a convex lens surface, and
    the rail substrate has a curved structure corresponding to the convex lens surface.

2. The hologram display device of claim 1, further comprising:
    a second optical system which focuses the planar light beam output from the light guide plate,
    wherein the first optical system converts the light emitted thereto from the light source to a collimated beam and provides the collimated beam to the light guide plate.

3. The hologram display device of claim 2, wherein the position adjusting unit turns on the light source at a first light-emitting position when the user is located at a predetermined reference position, moves the light source from the first light-emitting position to a second light-emitting position when the user moves from the reference position to a first position, and moves the light source from the first light-emitting position to a third light-emitting position when the user moves from the reference position to the second position.

4. The hologram display device of claim 3, wherein the reference position coincides with a focal position focused by the second optical system.

* * * * *